(12) United States Patent
Ueda et al.

(10) Patent No.: US 9,734,306 B2
(45) Date of Patent: *Aug. 15, 2017

(54) INFORMATION PROCESSING APPARATUS, INFORMATION PROCESSING SYSTEM, INFORMATION PROCESSING METHOD, AND PROGRAM

(71) Applicant: Sony Corporation, Tokyo (JP)

(72) Inventors: Kenjiro Ueda, Kanagawa (JP); Hiroshi Kuno, Kanagawa (JP); Yoshiyuki Kobayashi, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/401,395

(22) PCT Filed: Mar. 25, 2013

(86) PCT No.: PCT/JP2013/058595
§ 371 (c)(1),
(2) Date: Nov. 14, 2014

(87) PCT Pub. No.: WO2013/175850
PCT Pub. Date: Nov. 28, 2013

(65) Prior Publication Data
US 2015/0143135 A1    May 21, 2015

(30) Foreign Application Priority Data
May 21, 2012   (JP) .................................. 2012-115393

(51) Int. Cl.
*G06F 11/30*    (2006.01)
*G06F 12/14*    (2006.01)
(Continued)

(52) U.S. Cl.
CPC .............. *G06F 21/10* (2013.01); *G06F 21/44* (2013.01); *G06F 21/62* (2013.01); *H04L 9/0897* (2013.01);
(Continued)

(58) Field of Classification Search
CPC ...................................................... G06F 21/10
(Continued)

(56) References Cited

U.S. PATENT DOCUMENTS 6,002,772 A * 12/1999 Saito ........................ G06F 21/10
348/E7.056
7,380,120 B1 * 5/2008 Garcia ................. G06F 21/6209
380/200

(Continued)

FOREIGN PATENT DOCUMENTS

JP    4-0182885 B2    6/1992
JP    2004-192687 A    7/2004
(Continued)

OTHER PUBLICATIONS

International Search Report from International Publication PCT/JP2013/058595 mailed Jun. 25, 2013.

*Primary Examiner* — Taghi Arani
*Assistant Examiner* — Khalil Naghdali
(74) *Attorney, Agent, or Firm* — Chip Law Group

(57) ABSTRACT

Disclosed is a structure that includes: an information processing apparatus that stores content into an information storage device such as a memory card including an access allowed block based on an access right check made on each block, and uses the content; a content usage managing server that provides content usage permission information to the information processing apparatus; and a content correspondence information providing server that provides the encryption key to be used in decrypting the encrypted content (Continued)

stored in the information storage device. The content usage managing server determines the block for storing the encryption key and notifies the content correspondence information providing server of a block identifier that is the identifier of the determined block, and the content correspondence information providing server performs a process to write the encryption key into the block corresponding to the received block identifier.

17 Claims, 13 Drawing Sheets

(51) Int. Cl.

| | | |
|---|---|---|
| *G06F 21/10* | (2013.01) | |
| *G06F 21/44* | (2013.01) | |
| *G06F 21/62* | (2013.01) | |
| *H04L 9/08* | (2006.01) | |
| *H04L 9/32* | (2006.01) | |

(52) U.S. Cl.
CPC ............ *H04L 9/321* (2013.01); *H04L 9/3263* (2013.01); *G06F 2221/0753* (2013.01); *H04L 2209/60* (2013.01)

(58) Field of Classification Search
USPC .......................................................... 713/193
See application file for complete search history.

(56) References Cited

U.S. PATENT DOCUMENTS

| | | | |
|---|---|---|---|
| 8,359,273 B2 * | 1/2013 | Leleu ................. | G06Q 20/1235 705/59 |
| 8,588,580 B2 | 11/2013 | Tanaka et al. | |
| 8,782,407 B2 | 7/2014 | Kuno et al. | |
| 2002/0157002 A1 * | 10/2002 | Messerges .............. | G06F 21/10 713/155 |
| 2007/0156603 A1 * | 7/2007 | Yoon ....................... | G06F 21/10 705/59 |
| 2010/0138652 A1 * | 6/2010 | Sela ....................... | G06F 21/445 713/158 |
| 2010/0202606 A1 * | 8/2010 | Almeida ............... | H04L 9/0863 380/28 |
| 2011/0221568 A1 * | 9/2011 | Giobbi .................. | G06F 19/322 340/5.82 |
| 2012/0045062 A1 | 2/2012 | Kuno et al. | |

FOREIGN PATENT DOCUMENTS

| | | |
|---|---|---|
| JP | 2008-098765 A | 4/2008 |
| JP | 4814407 B1 | 11/2011 |
| JP | 2012-008756 A | 1/2012 |
| JP | 2012-044577 A | 3/2012 |

* cited by examiner

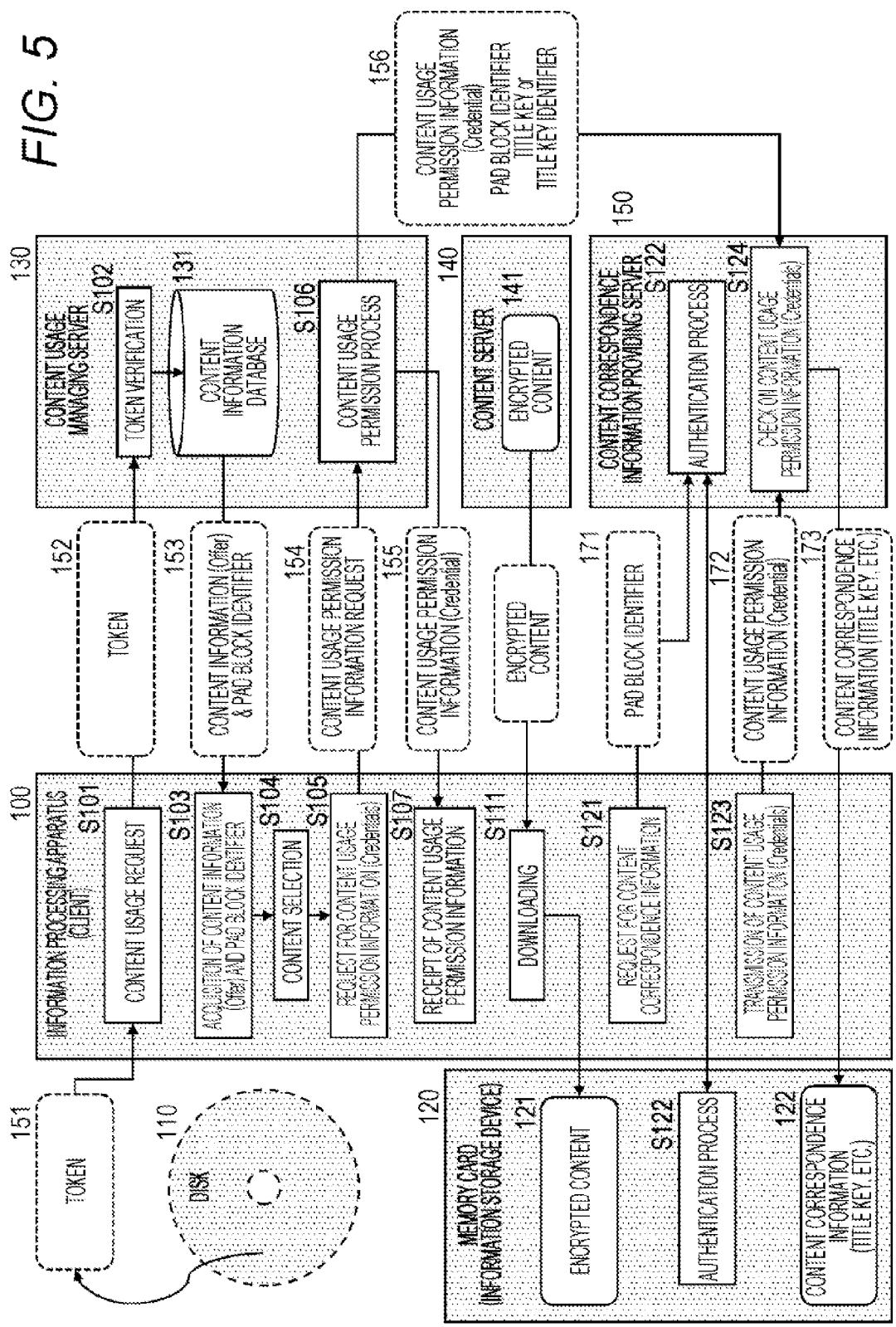

FIG. 6

CONTENT INFORMATION (Offer)

| NAME | DETAILS |
|---|---|
| VERSION INFORMATION (Version) | VERSION INFORMATION ABOUT MESSAGE |
| LANGUAGE CODE (Language Code) | INFORMATION ABOUT LANGUAGE USED IN TEXT |
| STATUS NUMBER (Status Number) | IDENTIFICATION NUMBER INDICATING SUCCESS/FAILURE |
| CONTENT INFORMATION (Offer Information) — OFFER INDEX (Offer Index) | INDEX FOR IDENTIFYING REQUEST |
| CONTENT INFORMATION (Offer Information) — PROTECTION TYPE (Protection Type) | INFORMATION ABOUT COPYRIGHT PROTECTION LEVEL |
| CONTENT INFORMATION (Offer Information) — PAD BLOCK IDENTIFIER (PAD Block Number) | IDENTIFIER OF PAD BLOCK FOR STORING TITLE KEY |
| CONTENT INFORMATION (Offer Information) — CONTENT PROFILE | ATTRIBUTE (SUCH AS mp4 AND TS) OF CONTENT |
| CONTENT INFORMATION (Offer Information) — FILE SIZE | FILE SIZE OF CONTENT |
| CONTENT INFORMATION (Offer Information) — ... | ... |
| SESSION ID (Session ID) | IDENTIFIER (ID) OF SESSION |

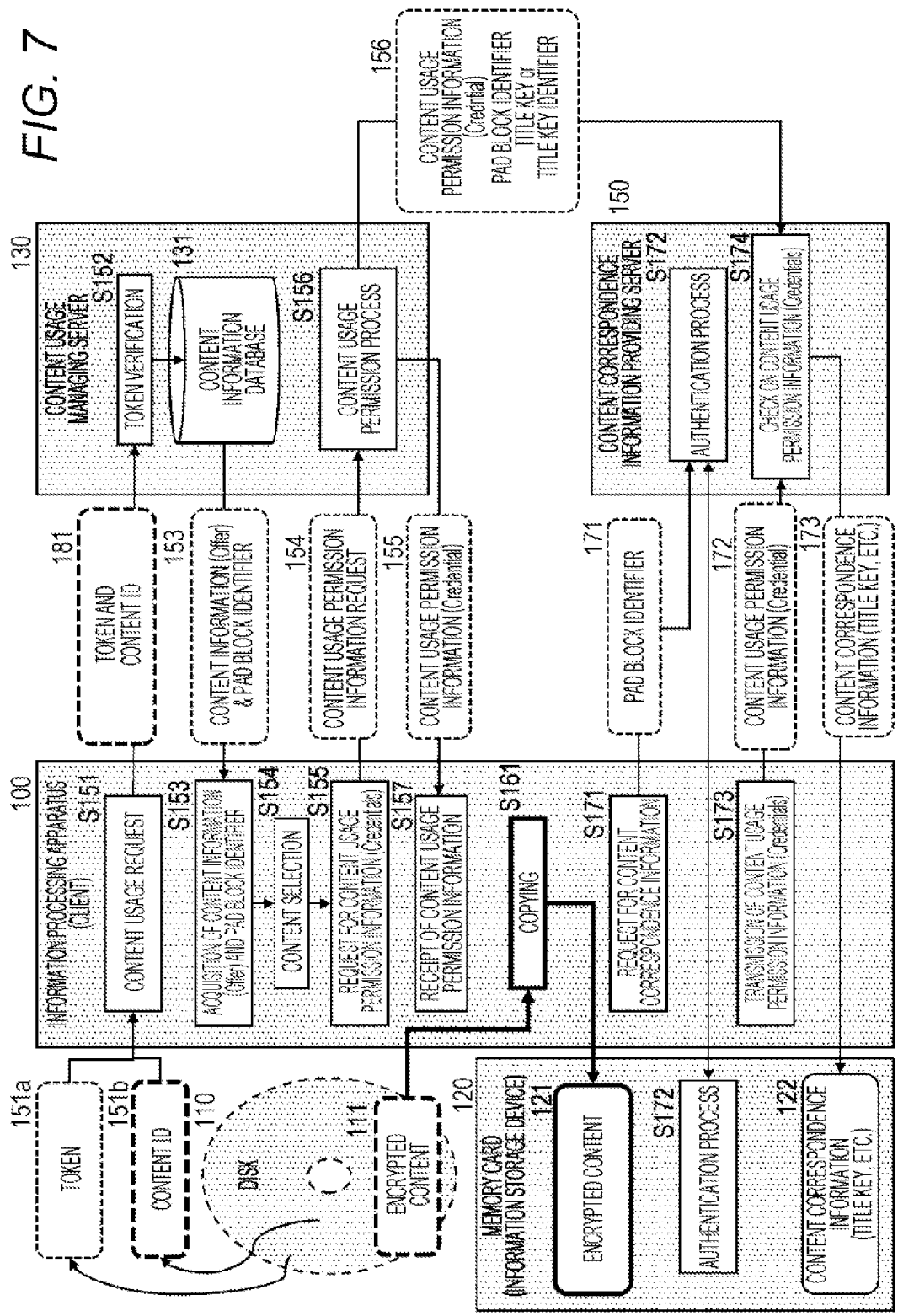

INFORMATION PROCESSING APPARATUS, INFORMATION PROCESSING SYSTEM, INFORMATION PROCESSING METHOD, AND PROGRAM

CROSS-REFERENCE TO RELATED APPLICATION

The present application is a national phase entry under 35 U.S.C. §371 of International Application No. PCT/JP2013/058595 filed Mar. 25, 2013, published on Nov. 28, 2013 as WO 2013/175850 A1, which claims priority from Japanese Patent Application No. JP 2012-115393, filed in the Japanese Patent Office on May 21, 2012.

TECHNICAL FIELD

The present disclosure relates to information processing apparatuses, information processing systems, information processing methods, and programs. More particularly, the present disclosure relates to an information processing apparatus, an information processing system, an information processing method, and a program for performing control on recording and usage of content and encryption keys.

BACKGROUND ART

Content such as movies and music is provided to users via various media such as a DVD (Digital Versatile Disc), a Blu-ray Disc (a registered trade name), and a flash memory, a network such as the Internet, or broadcast waves. A user can reproduce content by using a recording/reproducing apparatus such as a PC, a portable terminal, or a BD player, or an information processing apparatus such as a television set.

However, the copyrights, distribution rights, and the like of most pieces of content such as music data and image data to be provided to users are held by the creators of the content or distributors. Therefore, when providing content to users, a content provider puts a predetermined usage restriction on the content in many cases.

There have been problems that recording and reproduction can be repeated with some digital recording apparatuses and recording media without degrading images and sound, and the use of unauthorized copies of content such as distributions of unauthorized copies of content over the Internet and distributions of so-called pirated disks is widely spread.

As a specific measure to prevent such unauthorized use of content, there is a content encryption process. This is a process to encrypt content to be provided to users, and allow only authorized users to acquire the encryption key to the content. Such a process is disclosed in Patent Document 1 (JP 2008-98765 A), for example.

The key to be used in decrypting encrypted data is given only to the reproducing apparatuses granted the license to use the content. The license is granted to reproducing apparatuses that are designed to comply with predetermined operation rules such as not to make unauthorized copies. Meanwhile, reproducing apparatuses not granted the license are unable to decrypt encrypted data, not having the key for decrypting encrypted data.

However, even after the above process is performed, it is difficult to prevent users who have made authorized purchases of content from providing others with the key for content decryption acquired from a server. Specifically, there might be a case where the key acquired from the server is put up on the Internet so that the general public can use the key. Where such an action is taken, anyone is allowed to decrypt, reproduce, and use encrypted content by using the leaked key, and unauthorized use of the content becomes rampant.

CITATION LIST

Patent Document

Patent Document 1: JP 2008-98765 A

SUMMARY OF THE INVENTION

Problems to be Solved by the Invention

The present disclosure is being made in view of the above described problems, for example, and aims to provide an information processing apparatus, an information processing system, an information processing method, and a program for performing control on recording and usage of content and an encryption keys, so as to realize strict content usage control.

Solutions to Problems

A first aspect of the present disclosure lies in
an information processing apparatus that includes
a data processing unit that accesses a data storage unit attached to the information processing apparatus,
wherein the data storage unit stores encrypted content and data containing an encryption key to be used in decrypting the encrypted content, and has a protected area including blocks allowing access thereto based on an access right check made on each of the blocks,
the data processing unit
inputs a block identifier from a content usage managing server, the block identifier being information for designating a block for storing the encryption key,
transmits the input block identifier to a content correspondence information providing server that performs a process to write the encryption key, and
performs a process to write the encrypted content into the data storage unit,
the data storage unit includes
an in-storage data processing unit that makes the access right check to determine whether the content correspondence information providing server is a server allowed to write data into the block corresponding to the block identifier based on a server certificate set for the content correspondence information providing server, and
the in-storage data processing unit allows the content correspondence information providing server to write the encryption key into the block in the protected area when the access right is confirmed.

Further, in an embodiment of the information processing apparatus of the present disclosure, the data processing unit inputs content information about the encrypted content from the content usage managing server, and inputs the block identifier in conjunction with the content information.

Further, in an embodiment of the information processing apparatus of the present disclosure, the data processing unit inputs content usage permission information about the encrypted content from the content usage managing server, and inputs the block identifier in conjunction with the content usage permission information.

Further, in an embodiment of the information processing apparatus of the present disclosure, the data processing unit transmits the content usage permission information to the content correspondence information providing server in a process to make an acquisition request for the encryption key.

Further, in an embodiment of the information processing apparatus of the present disclosure, the data processing unit acquires the encrypted content to be stored into the data storage unit, from a content server or a medium attached to the information processing apparatus.

Further, in an embodiment of the information processing apparatus of the present disclosure, the in-storage data processing unit performs an authentication process on the content correspondence information providing server, and, on condition of successful authentication, allows the content correspondence information providing server to write the encryption key into the block in the protected area.

Further, in an embodiment of the information processing apparatus of the present disclosure, the in-storage data processing unit receives the server certificate from the content correspondence information providing server, and makes the access right check based on the received server certificate.

A second aspect of the present disclosure lies in a content usage managing server that performs a usage management process on content to be recorded into an information storage device attached to an information processing apparatus, wherein the information storage device has a protected area including blocks that allow access thereto based on an access right check made on each of the blocks, and the content usage managing server determines a block for storing an encryption key to be used in decrypting encrypted content recorded in the information storage device, and notifies a content correspondence information providing server of a block identifier, the content correspondence information providing server performing a process to record the encryption key, the block identifier being the identifier of the determined block.

Further, in an embodiment of the content usage managing server of the present disclosure, the content usage managing server transmits the block identifier to the information processing apparatus.

Further, in an embodiment of the content usage managing server of the present disclosure, the content usage managing server transmits the block identifier in conjunction with content information or content usage permission information to be provided to the information processing apparatus.

A third aspect of the present disclosure lies in a content correspondence information providing server that transmits an encryption key to an information storage device attached to an information processing apparatus, the encryption key being to be used in decrypting encrypted content recorded in the information storage device, wherein the information storage device has a protected area including blocks that allow access thereto based on an access right check made on each of the blocks, and the content correspondence information providing server performs a process to write the encryption key into the block corresponding to a block identifier transmitted from a content usage managing server.

Further, in an embodiment of the content correspondence information providing server of the present disclosure, the content correspondence information providing server transmits a server certificate storing access right information about the respective blocks of the information storage device to the information storage device, and performs a process to write the encryption key when the content correspondence information providing server is confirmed to be a server allowed to write data into the block corresponding to the block identifier through a check process performed on the server certificate in the information storage device.

Further, a fourth aspect of the present disclosure lies in
an information processing system that includes:
an information processing apparatus that uses content stored in an information storage device;
a content usage managing server that provides content usage permission information to the information processing apparatus; and
a content correspondence information providing server that provides an encryption key to be used in decrypting encrypted content stored in the information storage device,
wherein the information storage device has a protected area including blocks that allow access thereto based on an access right check made on each of the blocks,
the content usage managing server determines a block for storing the encryption key to be used in decrypting the encrypted content recorded in the information storage device, and notifies the content correspondence information providing server of a block identifier that is the identifier of the determined block, and
the content correspondence information providing server performs a process to write the encryption key into the block corresponding to the block identifier transmitted from the content usage managing server.

Further, in an embodiment of the information processing system of the present disclosure, the content correspondence information providing server transmits a server certificate storing access right information about the respective blocks of the information storage device to the information storage device, and performs a process to write the encryption key when the content correspondence information providing server is confirmed to be a server allowed to write data into the block corresponding to the block identifier through a check process performed on the server certificate in the information storage device.

Further, a fifth aspect of the present disclosure lies in
an information processing method implemented in an information processing apparatus,
wherein the information processing apparatus includes
a data processing unit that accesses a data storage unit attached to the information processing apparatus,
the data storage unit stores encrypted content and data containing an encryption key to be used in decrypting the encrypted content, and has a protected area including blocks that allow access thereto based on an access right check made on each of the blocks,
the data processing unit performs
a process to input a block identifier from a content usage managing server, the block identifier being information for designating a block for storing the encryption key,
a process to transmit the input block identifier to a content correspondence information providing server that performs a process to write the encryption key, and
a process to write the encrypted content into the data storage unit, and
an in-storage data processing unit of the data storage unit makes the access right check to determine whether the content correspondence information providing server is a server allowed to write data into the block corresponding to the block identifier based on a server certificate set for the content correspondence information providing server, and
allows the content correspondence information providing server to write the encryption key into the block in the protected area when the access right is confirmed.

Further, a sixth aspect of the present disclosure lies in a program for causing an information processing apparatus to perform information processing, wherein the information processing apparatus includes a data processing unit that accesses a data storage unit attached to the information processing apparatus, the data storage unit stores encrypted content and data containing an encryption key to be used in decrypting the encrypted content, and has a protected area including blocks that allow access thereto based on an access right check made on each of the blocks, and the program causes the data processing unit to perform a process to input a block identifier from a content usage managing server, the block identifier being information for designating a block for storing the encryption key, a process to transmit the input block identifier to a content correspondence information providing server that performs a process to write the encryption key, and a process to write the encrypted content into the data storage unit, and causes an in-storage data processing unit of the data storage unit to perform an access right check process to determine whether the content correspondence information providing server is a server allowed to write data into the block corresponding to the block identifier based on a server certificate set for the content correspondence information providing server, and a process to allow the content correspondence information providing server to write the encryption key into the block in the protected area when the access right is confirmed.

The program of the present disclosure is a program that can be provided in a computer-readable format from a storage medium or a communication medium to an information processing apparatus or a computer system that can execute various program codes, for example. As such a program is provided in a computer-readable format, processes in accordance with the program are realized in an information processing apparatus or a computer system.

Other objects, features, and advantages of the present disclosure will be made apparent by the embodiments of the present disclosure described below and the detailed descriptions with reference to the accompanying drawings. In this specification, a system is a logical assembly of devices, and does not necessarily mean devices with different structures incorporated into one housing.

Effects of the Invention

An embodiment of the present disclosure realizes a structure that can unify the management of the storage block for the encryption key to be used in decrypting encrypted content stored in a memory card.

Specifically, this structure includes: an information processing apparatus that stores content into an information storage device such as a memory card including an access allowed block based on an access right check made on each block, and uses the content; a content usage managing server that provides content usage permission information to the information processing apparatus; and a content correspondence information providing server that provides the encryption key to be used in decrypting the encrypted content stored in the information storage device. The content usage managing server determines the block for storing the encryption key and notifies the content correspondence information providing server of a block identifier that is the identifier of the determined block, and the content correspondence information providing server performs a process to write the encryption key into the block corresponding to the received block identifier.

With these apparatuses, a structure that can unify the management of the storage block for the encryption key to be used in decrypting encrypted content stored in a memory card can be realized.

BRIEF DESCRIPTION OF DRAWINGS

FIG. 5 is a diagram for explaining an example of an encrypted content download recording process.

FIG. 6 is a diagram for explaining an example data structure of content information.

FIG. 7 is a diagram for explaining an example of an encrypted content copy recording process.

MODES FOR CARRYING OUT THE INVENTION

Figure 1:
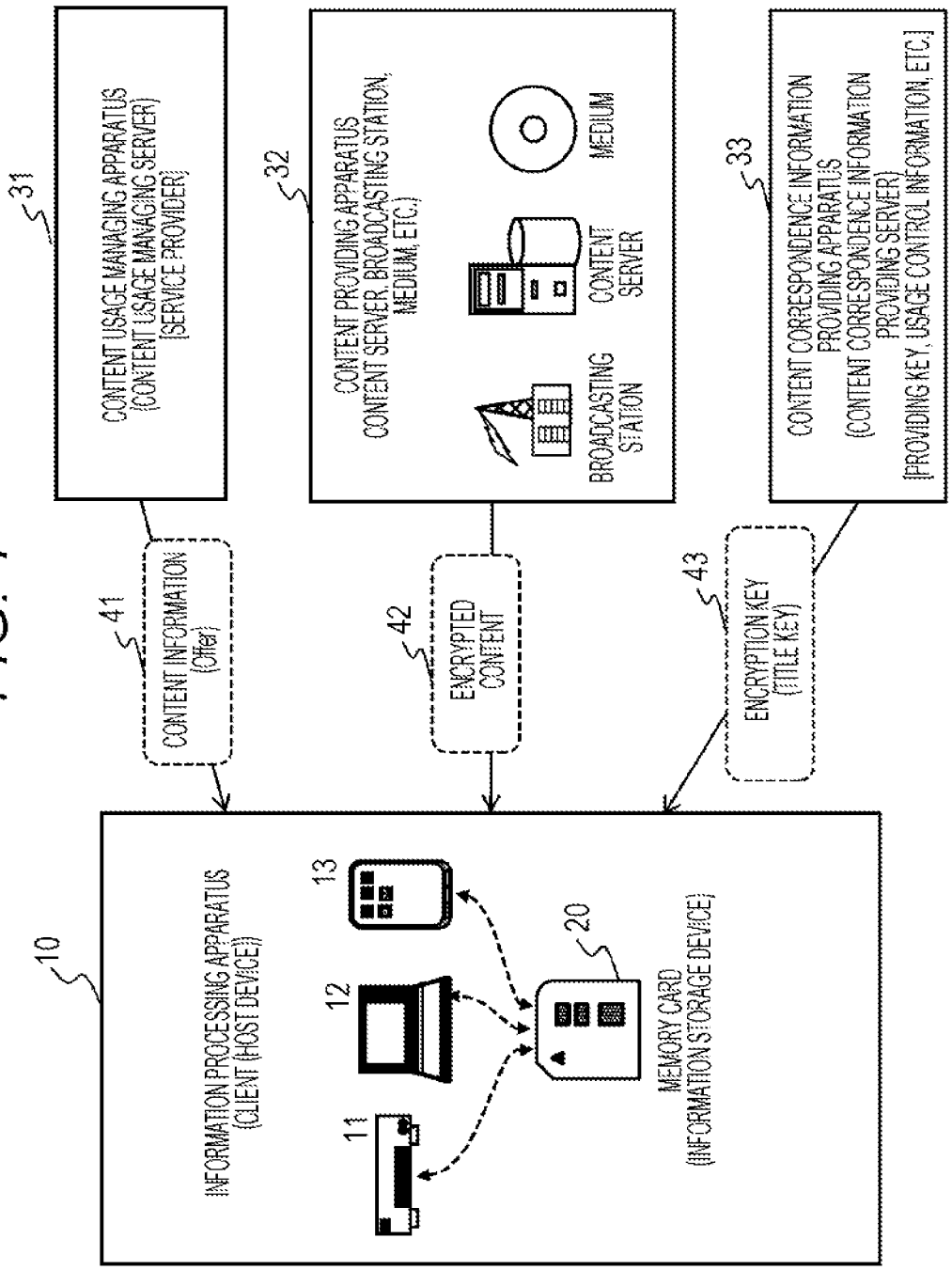
FIG. 1 is a diagram for explaining outlines of a content providing process and a recording process.

The following is a detailed description of information processing apparatuses, information processing systems, information processing methods, and programs of the present disclosure, with reference to the drawings. Explanation will be made in the following order.

1. Outlines of a content providing process and a recording process

2. Example structure of a memory card as a content recording medium 3. (First Embodiment) Example processes of notification of the block identifier of a block for key writing in conjunction with content information (Offer) in a content recording process performed on a memory card 3-1. Example of a content download process in the first embodiment 3-2. Example of a content copy process in the first embodiment 3-3. Communication sequence among the respective components in the first embodiment 4. (Second Embodiment) Example processes of notification of the block identifier of a block for key writing in conjunction with content usage permission information (Credential) in a content recording process performed on a memory card 4-1. Example of a content download process in the second embodiment 4-2. Example of a content copy process in the second embodiment 4-3. Communication sequence among the respective components in the second embodiment 5. Example hardware configurations of respective apparatuses 6. Summary of the structure of the present disclosure

1. Outlines of a Content Providing Process and a Recording Process

The following is a description of a configuration of the present disclosure, with reference to the drawings.

Referring first to FIG. 1, outlines of a content providing process and a recording process are described.

FIG. 1 shows the following structures:

(a) an information processing apparatus 10;
(b) a content usage managing apparatus 31;
(c) a content providing apparatus 32; and
(d) a content correspondence information providing apparatus 33.

The information processing apparatus 10 is an information processing apparatus 10 serving as a user device that uses content, and is also called a client or a host device in some cases.

Specifically, the information processing apparatus 10 is a reproducing apparatus 11 such as a media player, a PC 12, or a portable terminal 13.

A memory card 20 that is an information storage device having a flash memory mounted thereon is attached to the information processing apparatus 10, for example, and content that is input from outside is written into the memory card 20 so that content use such as reproduction is performed.

The information processing apparatus 10 can also write content using not the memory card 20 but some other medium, and perform content use such as reproduction.

Specifically, content that is input from outside is written into any kind of medium such as an internal flash memory that is an internal medium, an internal disk such as a HDD, BD, or DVD, an external USB memory, or an external disk such as a HDD, BD, or DVD, and content use such as reproduction is performed.

In a case where the information processing apparatus 10 as the user device downloads content from outside or copies content from a medium, the information processing apparatus 10 first needs to access the content usage managing apparatus 31 and obtain permission to download or copy the content. The content usage managing apparatus 31 is formed with a content usage managing server or the like operated by a service provider, for example.

As shown in the drawing, in response to a request from the information processing apparatus 10 as the user device, the content usage managing apparatus 31 provides content information (Offer) 41 containing information about downloadable content or the content to be copied.

The content providing apparatus 32 provides encrypted content 42 to the information processing apparatus 10. Specifically, the content providing apparatus 32 is formed with a broadcasting station, content server, or a medium such as a DVD or a BD, for example.

In a case where content provided by a broadcasting station or a content server is recorded into the memory card 20 attached to the information processing apparatus 10 serving as the user device, a process of the present disclosure is performed.

Also, in a case where content recorded on a medium such as a DVD or a BD owned by a user is copied into the memory card 20, the process of the present disclosure is used.

In a case where content is acquired from a content server and is recorded into the memory card 20, for example, the information processing apparatus 10 needs access information to acquire the content, and this information is included in the content information (Offer) 41 provided by the content usage managing apparatus 31, for example. Alternatively, this information may be acquired from a medium such as a DVD or a BD attached to the information processing apparatus 10.

The content correspondence information providing apparatus 33 provides the information processing apparatus 10 or the memory card 20 with the key necessary for using the encrypted content 42 provided by the content providing apparatus 32, or an encryption key 43 and the like to be used for decrypting encrypted content. In the embodiments described below, this encryption key will be referred to as a title key. A title key is a key unique to a content title that is set for each title of content.

The information processing apparatus 10 needs access information to acquire the encryption key (title key) 43, and this information is included in the content information (Offer) 41 provided by the content usage managing apparatus 31, for example. Alternatively, this information may be acquired from a medium such as a DVD or a BD attached to the information processing apparatus 10.

The content correspondence information providing apparatus 33 also provides the information processing apparatus 10 with usage control information (called Usage Rule File or Control File) containing the usage control information about the encrypted content 42 provided by the content providing apparatus 32, as well as the encryption key (title key) 43.

The usage control information contains various kinds of usage control information including allowed usage information about the content, such as whether copying into other media is allowed, and the expiration date.

In accordance with a program stored beforehand in a storage unit, the information processing apparatus 10 reads the usage control information and the encryption key (title key) corresponding to the content to be used, decrypts the encrypted content with the title key, and uses the content within the allowed range recorded in the usage control information.

Although the content usage managing apparatus 31, the content providing apparatus 32, and the content correspondence information providing apparatus 33 are shown as independent apparatuses in FIG. 1, these apparatuses may be set as independent apparatuses, or may be set as a structure that has the functions of several apparatuses in one apparatus.

For example, the content usage managing apparatus 31 and the content providing apparatus 32 may be set as one apparatus.

Alternatively, the content providing apparatus 32 and the content correspondence information providing apparatus 33 may be set as one apparatus.

Other than the above, various settings are possible, such as forming an apparatus that has all the functions of the content usage managing apparatus 31, the content providing apparatus 32, and the content correspondence information providing apparatus 33.

The information processing apparatus 10 records various kinds of data into the memory card 20 that is an information storage device, the various kinds of data including the encrypted content 42 acquired from the content providing apparatus 32 (such as a broadcasting station, a content server, or a medium attached to the information processing apparatus 10), the encryption key 43 received from the content correspondence information providing apparatus 33, and the like.

2. Example Structure of a Memory Card as a Content Recording Medium

Next, an example structure of the memory card formed with a flash memory or the like to be used as a content recording destination is described.

Figure 2:
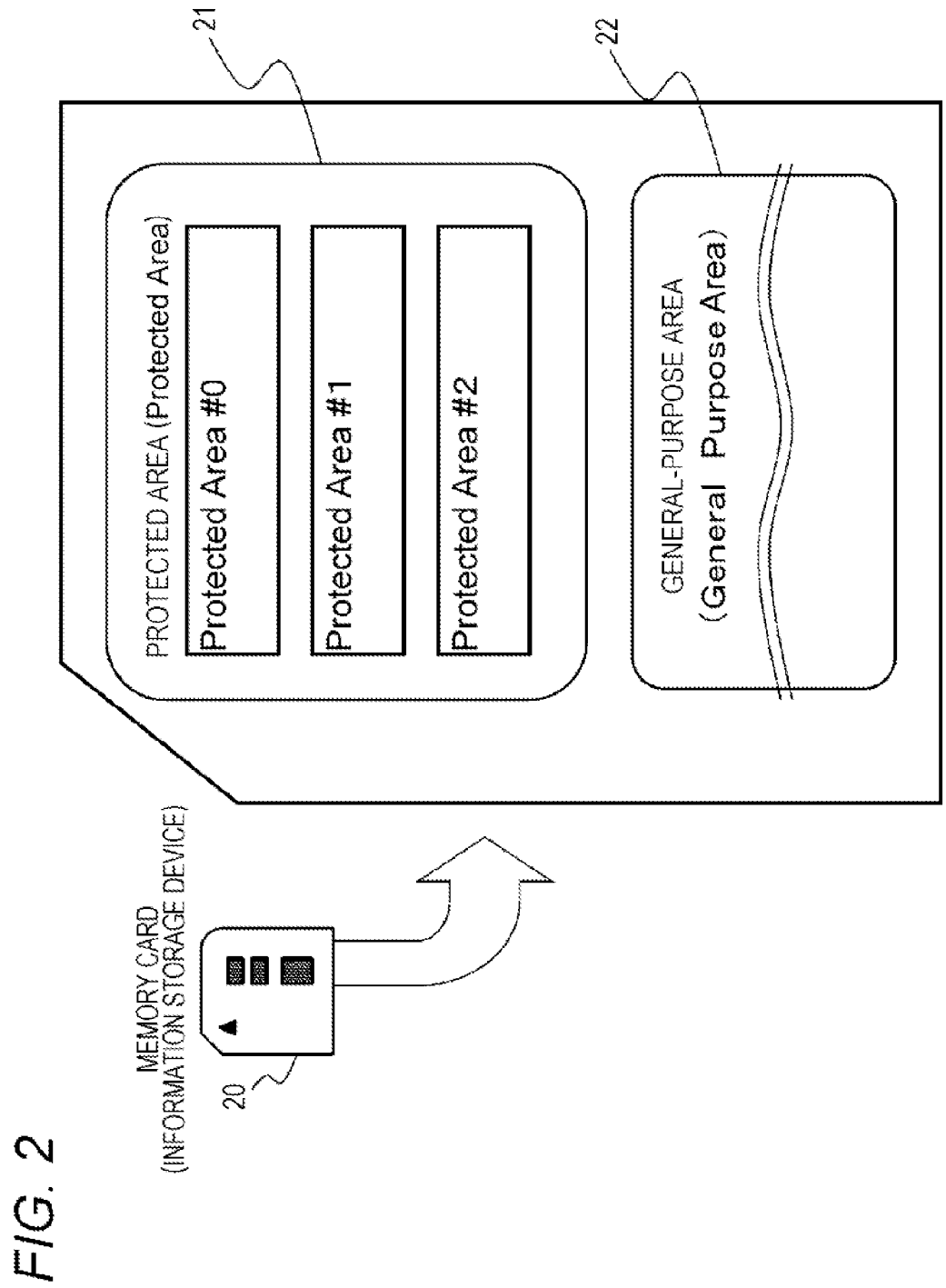
FIG. 2 is a diagram for explaining an example structure of a memory card.

FIG. 2 shows a specific example structure of the storage area of the memory card 20.

As shown in FIG. 2, the storage area of the memory card 20 is formed with the two regions of (a) a protected area (Protected Area) 21, and (b) a general-purpose area (General Purpose Area) 22.

(b) The general-purpose area (General Purpose Area) 22 is an area that can be freely accessed by a recording/reproducing apparatus being used by the user, and stores encrypted content, general content management data, and the like. This is the area where the user can freely perform data writing and reading.

On the other hand, (a) the protected area (Protected Area) 21 is the area where free access is not allowed.

For example, in a case where data writing or reading is performed by a recording/reproducing apparatus being used by the user, a reproducing apparatus, a server connected thereto via a network, or the like, reading (Read) or writing (Write) is permitted or prohibited depending on the apparatus in accordance with the program stored beforehand in the memory card 20.

The memory card 20 includes a data processing unit for executing the prestored program and an authentication processing unit that performs an authentication process, and the memory card 20 first performs an authentication process on the apparatus that is to perform data writing or reading on the memory card 20.

In the stage of this authentication process, an apparatus certificate (a server certificate (Server Cert), for example) such as a public key certificate is received from the apparatus on the other end or the access requesting apparatus, and a check is made to determine whether to allow access to respective blocks that are the respective sectioned areas in the protected area (Protected Area) 21, using the information written in the certificate. This determination process is performed on each of the blocks (areas #0, #1, #2, . . . , in the drawing) that are the sectioned areas in the protected area (Protected Area) 21 shown in FIG. 2, and a permitted process (Read and/or Write) is performed only on the permitted blocks.

Figure 3:
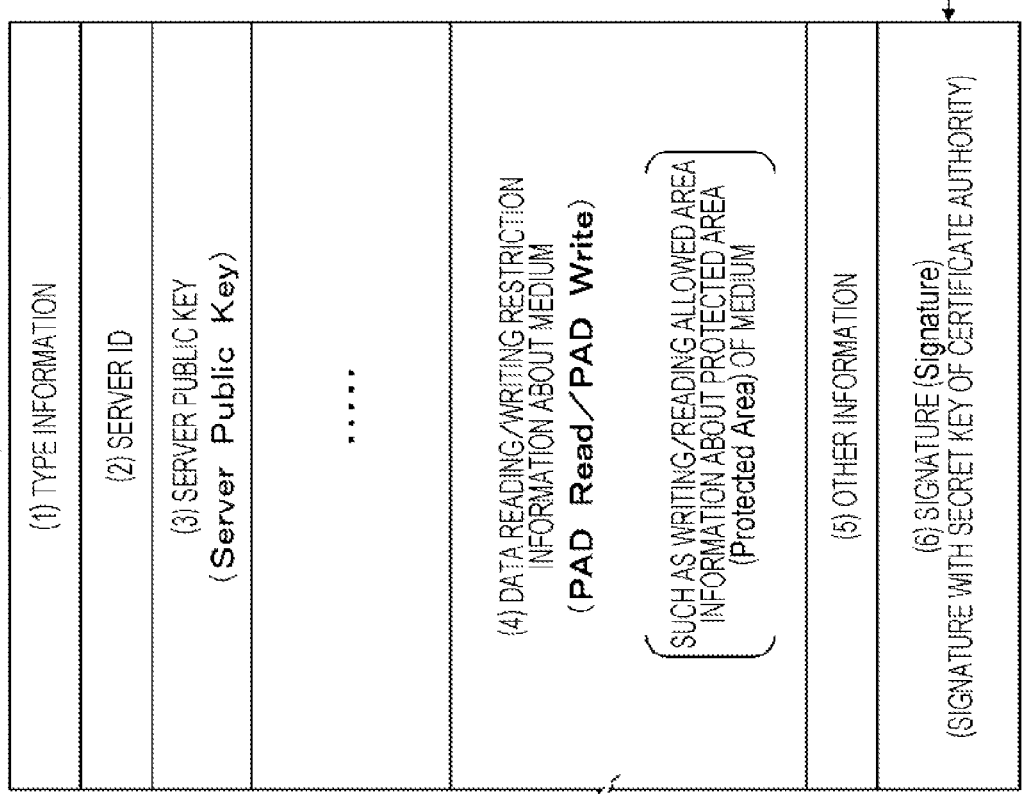
FIG. 3 is a diagram for explaining an example data structure of a server certificate (Server Certificate).

FIG. 3 shows an example data structure of a server certificate held by a server that is an example of an apparatus that performs data writing on the memory card. FIG. 3 is a diagram showing an example data structure of a server certificate (Server Certificate) to be provided to a server by a certificate authority.

A server certificate (Server Certificate) is a certificate issued to a server that is allowed a content providing process by the certificate authority, and is a certificate storing a server public key and the like. In the server certificate (Server Certificate), a signature is set with a certificate authority secret key, and is designed as data that is protected from falsification.

As shown in FIG. 3, the server certificate (Server Certificate) includes the following data:

(1) type information;
(2) a server ID;
(3) a server public key (Server Public Key);
(4) reading/writing restriction information (PAD Read/PAD Write) about the blocks in the protected area in the medium (memory card);
(5) other information; and
(6) a signature (Signature).

The above data (1) through (6) are described below.

(1) Type Information

The type information is information indicating the type of the certificate and the type of the content server, and stores data indicating that this certificate is a server certificate, and information indicating the type of the server such as a music content providing server or a movie content providing server.

(2) Server ID

The server ID is an area where a server ID as server identification information is recorded.

(3) Server Public Key (Server Public Key)

The server public key (Server Public Key) is the public key of the server. The server public key and a server secret key provided to the server form a key pair compliant to a public key cryptosystem.

(4) Reading/Writing Restriction Information (PAD Read/PAD Write) about the Blocks in the Protected Area in the Medium (Memory Card)

The reading/writing restriction information (PAD Read/PAD Write) for the medium contains access permission/prohibition information about the medium storing the content, such as the blocks in the protected area (Protected Area) 21 set in the storage area of the memory card 20 shown in FIG. 2.

That is, the reading/writing restriction information contains information about the blocks in which data reading (Read) and writing (Write) are allowed. The blocks in the protected area (Protected Area) 21 of the memory card are also called PAD blocks.

The memory card refers to this record field in the server certificate of FIG. 3 received in the stage of the authentication process from the server, for example, performs writing in blocks (areas #0, #1, #2, . . . , in the drawing) in the protected area (Protected Area) 21 shown in FIG. 2, for example, performs a reading permission determination process, and allows execution of only the permitted process in the permitted sectioned areas.

As shown in FIG. 3, in addition to the above described data, the server certificate (Server Cert) stores (5) other information, and further stores (6) the signature (Signature) generated for the data (1) through (5) with the secret key of the certificate authority. With this signature, a falsification preventing mechanism is realized.

In a case where the server certificate (Server Cert) is used, signature verification is conducted to check the validity of the server certificate (Server Cert) prior to use. The signature verification is conducted by using a public key of the certificate authority.

Other than the server requesting access to the protected area of the memory card, an apparatus such as a recording apparatus or a reproducing apparatus also stores a host public key, holds a host certificate storing the reading/writing restriction information (PAD Read/PAD Write) for the media shown in (4) in FIG. 3, and presents this host certificate to the memory card.

The memory card conducts signature verification on the certificate presented by the apparatus requesting access, confirms the validity of the certificate, then refers to the record of the reading/writing restriction information (PAD Read/PAD Write) in the certificate, performs writing on blocks (areas #0, #1, #2, . . . in the drawing) that are the sectioned areas in the protected area (Protected Area) 21 shown in FIG. 2, performs a reading permission determination process, and allows execution of only the permitted process in the permitted block areas.

As described above, the reading/writing restriction information (PAD Read/PAD Write) for the media is set for each apparatus trying to make access, such as each content server or each recording/reproducing apparatus (host). These pieces of information are recorded in the server certificates (Server Cert) or the host certificates (Host Cert) corresponding to respective apparatuses.

In accordance with the predetermined program stored beforehand in the memory card 20, the memory card 20 performs a process to verify recorded data in a server certificate (Server Cert) or a host certificate (Host Cert), and allows access only in access allowed areas.

Figure 4:
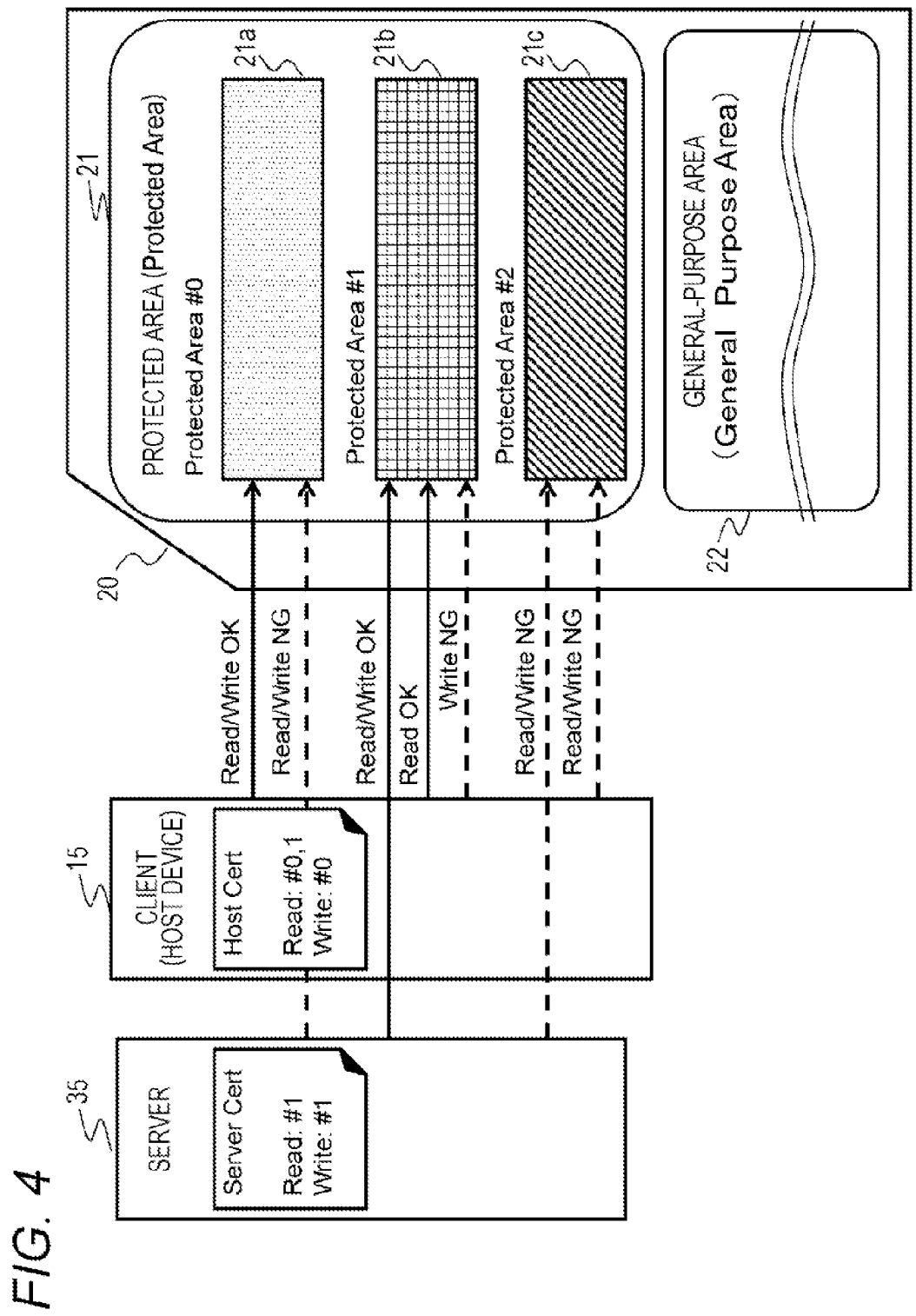
FIG. 4 is a diagram for explaining an example process of access to the memory card.

Referring now to FIG. 4, example settings of access restrictions in respective cases where the access requesting apparatus to the memory card is a server and where the apparatus is a host device such as a recording/reproducing apparatus are described.

FIG. 4 shows, from left, a server 35 that is an access requesting apparatus to the memory card, a client (a host device) 15, and the memory card 20.

The server 35 is a server that performs a content providing process, and a process to write the encryption key to be used in content decryption, for example.

The server 35 may be a content server equivalent to the content providing apparatus 32 shown in FIG. 1, or a content correspondence information providing server equivalent to the content correspondence information providing apparatus, for example.

The client (host device) 15 is an apparatus that performs a process to reproduce content stored in the memory card 20, and needs to acquire the encryption key recorded in the memory card to perform a content decryption process.

The memory card 20 includes the protected area (Protected Area) 21 and the general-purpose area (General Purpose Area) 22, and encrypted content and the like are recorded in the general-purpose area (General Purpose Area) 22.

The encryption key to be used in decrypting encrypted content is recorded in the protected area (Protected Area) 21.

As described above with reference to FIG. 2, the protected area (Protected Area) 21 is divided into blocks (PAD blocks).

The example shown in FIG. 4 has the three blocks of a block #0 (Protected Area #0) 21a, a block #1 (Protected Area #1) 21b, and a block #2 (Protected Area #2) 21c.

In the stage of this authentication process on the access requesting apparatus, the memory card 20 receives an apparatus certificate (a server certificate (Server Cert), for example) such as a public key certificate from the apparatus on the other end or the access requesting apparatus, and determines whether to allow access to the respective blocks in the protected area (Protected Area) 21, using the information written in the certificate. As a result of this determination process, only the permitted process is performed in the permitted blocks.

For example, writing allowed area information (PAD Write) recorded in the server certificate (Server Certificate) of the server is designed as a certificate in which permission of writing (Write) in the PAD block #1 (Protected Area #1) 21b is set. That is, as shown in the drawing, the settings shown below are designed.

Reading (Read) allowed area: block #1
Writing (Write) allowed area: block #1

In the example shown in the drawing, reading (Read) is also allowed in a writing (Write) allowed block.

The host certificate (Host Certificate) held by the client (host device) 15 as a reproducing apparatus that reads an encryption key recorded in the block #1 (Protected Area #1) 21b and performs content reproduction is a certificate with settings shown below.

Permission of reading (Read) and writing (Write) in the block #0 (Protected Area #0) 21a Permission of reading (Read) in the block #1 (Protected Area #1) 21b Such permission information is set in this certificate.

That is, as shown in the drawing, this certificate has the settings shown below.

Reading (Read) allowed areas: blocks #0 and #1
Writing (Write) allowed area: block #0

In the host certificate (Host Certificate), permission of writing (Write) in the block #1 (Protected Area #1) 21b in the protected area is not set.

However, permission of a deletion process may be set so that the encryption key corresponding to the content to be deleted can be deleted when the content is deleted.

The block #2 (Protected Area #2) 21c in the protected area is set as an area where access from both the server and the host is not allowed, or an external access prohibited area.

That is, the block #2 (Protected Area #2) 21c is set as an area to be accessed (for data writing and reading) by the data processing unit in the memory card 20 only when data processing is performed inside the memory card 20.

As described above, the data processing unit of the memory card determines whether to allow an access requesting apparatus to perform data writing and data reading on the protected area (Protected Area) 21 on a block basis in accordance with the apparatus certificate.

3. (First Embodiment) Example Processes of Notification of the Block Identifier of a Block for Key Writing in Conjunction with Content Information (Offer) in a Content Recording Process Performed on a Memory Card In a case where the information processing apparatus 10 as the user device records encrypted content, an encryption key (a title key), and the like into the memory card 20 attached to the information processing apparatus 10, a content usage managing server determines the block into which the title key is to be recorded, notifies the information processing apparatus (client) or the like of the block identifier that is the information for designating the determined block for key (title key) writing so that the title key is written into the designated block. This process is the embodiment described below.

First, an example process for a content usage managing server to make notification of a block identifier in conjunction with content information (Offer) is described as a first embodiment.

3-1. Example of a Content Download Process in the First Embodiment

Referring first to FIG. 5, a specific example of a process to be performed by the information processing apparatus 10 as the user device to record downloaded encrypted content and the encryption key (title key) to be used in decrypting the encrypted content into the memory card 20 attached to the information processing apparatus 10 is described.

FIG. 5 shows the respective structures listed below and the process:

(a) an information processing apparatus (client) 100;
(b) a memory card (information storage device) 120;
(c) a content usage managing server 130;
(d) a content server 140; and
(e) a content correspondence information providing server 150.

The correspondence with the respective structures shown in FIG. 1 are as follows.

(a) The information processing apparatus (client) 100 corresponds to the information processing apparatus 10 of FIG. 1.
(b) The memory card (information storage device) 120 corresponds to the memory card 20 shown in FIG. 1.
(c) The content usage managing server 130 corresponds to the content usage managing apparatus 31 shown in FIG. 1.
(d) The content server 140 corresponds to the content providing apparatus 32 shown in FIG. 1.
(e) The content correspondence information providing server 150 corresponds to the content correspondence information providing apparatus 33 shown in FIG. 1.

A disk 110 shown in the drawing is a disk attached to the information processing apparatus (client) 100.

The information processing apparatus (client) 100 has the memory card (information storage device) 120 attached thereto, and records encrypted content and an encryption key into the memory card (information storage device) 120.

As described above with reference to FIGS. 2 through 4, the memory card (information storage device) 120 includes the protected area (Protected Area) 21 on which an access restriction is put so that access is allowed in accordance with access allowance information recorded in a certificate, and the general-purpose area (General Purpose Area) 22 on which no such access restrictions are put. Encrypted content and the like are recorded into the general-purpose area (General Purpose Area) 22. The encryption key (title key) to be used in decrypting encrypted content is recorded in the protected area (Protected Area) 21.

FIG. 5 is a diagram for explaining a process to record encrypted content provided by the content server 140 and content correspondence information including an encryption key (a title key) provided by the content correspondence information providing server 150 into the memory card 120.

Data that are eventually recorded is shown in the memory card 120 in FIG. 5.

The recorded data is encrypted content 121 and content correspondence information (a title key and the like) 122.

A sequence for acquiring and recording these pieces of data is now described.

First, to acquire content, the information processing apparatus (client) 100 having the memory card 120 attached thereto issues a content usage request to the content usage managing server 130.

This is a content usage request process in step S101 shown in FIG. 5.

This content usage request process is performed via a web page that is made open to public on the Internet by a service provider that is the operator of the content usage managing server 130, for example.

This content usage request process may be performed in various modes. For example, a code (a coupon code) provided from the web page or a token 151 including a code stored in a content recording disk 110 is generated, and a token 152 is transmitted to the content usage managing server 130. Through such a process, content associated with particular content such as content stored in the disk 110 can be acquired.

Having received the content usage request, the content usage managing server 130 performs an authentication process on the information processing apparatus (client) 100, conducts verification of the received token on condition of successful authentication in step S102, selects available content based on the token, acquires content information (Offer) from the content information database 131, and transmits the content information (Offer) to the information processing apparatus (client) 100.

The content usage managing server 130 transmits a block identifier contained in this content information (Offer) to the information processing apparatus (client) 100.

That is, the block identifier of the block into which the encryption key (title key) to be used in decrypting the encrypted content to be acquired by the information processing apparatus (client) 100 is to be written is transmitted to the information processing apparatus (client) 100.

The content information and the block identifier are the "content information (Offer) & PAD block identifier 153" shown in FIG. 5.

In this manner, the content usage managing server 130 transmits the PAD block identifier as storage area designation information for the title key that is the encryption key to be used in content decryption, to the information processing apparatus (client) 100.

The PAD block identifier is the identifier of a block that is a sectioned area in the protected area ((Protected Area) of the memory card described above with reference to FIGS. 2 and 4. The encryption key (title key) to be used in decrypting encrypted content is stored into the block in the protected area (Protected Area) of the memory card.

As described above, the content usage managing server 130 notifies the information processing apparatus 100 of the PAD block identifier, to designate the block in the protected area (Protected Area) of the memory card into which the key (title key) for decrypting the encrypted content that is about to be acquired by the information processing apparatus (client) is to be stored.

That is, the content usage managing server 130 determines the storage area (block) for the encryption key (title key) to be used in content decryption.

Accordingly, the block determined by the content usage managing server 130 becomes available as the title key storage area.

FIG. 6 shows an example of the data in the content information (Offer) provided from the content usage managing server 130 to the information processing apparatus (client) 100.

As shown in FIG. 6, the content information (Offer) contains the following information:

(1) version information: information indicating the version of this message;
(2) a language code: a code indicating the type of the language used in text;

(3) a status number: information indicating success/failure of message transmission/reception;
(4) content information; and
(5) a session ID.

For example, the information listed below is contained in (4) the content information:
(4a) an offer index: identification information about the request from the client;
(4b) a protection type: information indicating the copyright protection level of the content;
(4c) a PAD block identifier: a PAD block identifier that is the information for designating the block for storing the title key;
(4d) a content profile: the attribute of the content, such as mp4 or TS; and
(4d) a file size: the file size of the content.

For example, these pieces of information are provided from the content usage managing server 130 to the information processing apparatus (client) 100.

These pieces of content information are associated with one set of content corresponding to one title. In a case where content information about more than one piece of content corresponding to more than one title is provided, the same number of sets of content information as the number of pieces of content are provided from the content usage managing server 130 to the information processing apparatus (client) 100.

The PAD block identifier (PAD Block Number) contained in the content information shown in FIG. 6 is the identifier for designating the block in the protected area of the memory card into which the title key that is the key for decrypting content is to be stored.

The information processing apparatus 100 further acquires encrypted content, and acquires the title key corresponding to the encrypted content.

The content correspondence information providing server 150 shown in FIG. 5 accesses the memory card 120, and writes the title key thereto.

The content correspondence information providing server 150 should store the title key into the block corresponding to the PAD block identifier designated by the content information.

This process will be described later.

After receiving the content information containing the PAD block identifier in step S103 in FIG. 5, the information processing apparatus 100 determines the content to be acquired in accordance with the content information in step S104. In a case where content information corresponding to pieces of content is received, for example, the content to be actually acquired is selected from among the pieces of content.

In step S105, the information processing apparatus 100 requests content usage permission information (Credential) accompanied by the identifier of the selected content. That is, the "content usage permission information request 154" shown in the drawing is transmitted to the content usage managing server 130.

Upon receipt of the "content usage permission information request 154" from the information processing apparatus (client) 100, the content usage managing server 130 in step S106 performs a content usage permission process to generate and transmit "content usage permission information (Credential) 155" to the information processing apparatus (client) 100.

The "content usage permission information (Credential) 155" is data formed with access information (such as a content URL (Uniform Resource Locator)) for acquiring encrypted content, access information (such as a content correspondence information URL) about the content correspondence information such as the title key, a random number generated by the content usage managing server 130, and the like.

In this content usage permission process in step S106, the content usage managing server 130 transmits the data 156 shown in the drawing to the content correspondence information providing server 150 that transmits the title key and the like.

The data 156 contains the following pieces of data:
(a) "content usage permission information (Credential)", which is the same data as the "content usage permission information (Credential) 155" transmitted to the information processing apparatus (client) 100;
(b) the PAD block identifier transmitted to the information processing apparatus (client) 100 earlier; and
(c) the title key or the title key identifier. The data 156 containing these pieces of data is transmitted to the content correspondence information providing server 150 that transmits the content correspondence information formed with the title key and the like.
(c) The title key or the title key identifier is the title key or the identifier thereof that can be used in decrypting the content selected in step S104 by the information processing apparatus (client) 100.

In a case where the content correspondence information providing server 150 holds the title key, the title key identifier is provided to the content correspondence information providing server 150.

After receiving the content usage permission information (Credential) from the content usage managing server 130 in step S107, the information processing apparatus (client) 100 acquires or downloads the content from the content server 140 in step S111. The content is encrypted content that can be decrypted with the title key corresponding to the content.

The access information such as the URL of encrypted content 141 held by the content server 140 is contained in the "content usage permission information (Credential) 155" acquired from the content usage managing server 130.

The information processing apparatus (client) 100 records the encrypted content downloaded from the content server 140 into the memory card 120 attached to the information processing apparatus (client) 100.

Here, the encrypted content is recorded into the general-purpose area (General Purpose Area) of the memory card 120. The encrypted content is encrypted content 121 shown in the drawing.

In step S121, the information processing apparatus (client) 100 transmits an acquisition request for the content correspondence information, or more specifically, the content correspondence information containing the title key to be used in decrypting the acquired encrypted content, the usage control information (Usage Rule File), and the like, to the content correspondence information providing server 150.

In transmitting this acquisition request for the content correspondence information, the information processing apparatus (client) 100 transmits a PAD block identifier 172 to the content correspondence information providing server 150, as shown in the drawing.

This PAD block identifier 172 is the PAD block identifier recorded in the content information (offer) received from the content usage managing server 130, or the content information (Offer) described above with reference to FIG. 6.

Upon receipt of the content correspondence information acquisition request including the PAD block identifier from the information processing apparatus (client) 100, the content correspondence information providing server 150 in step S122 performs an authentication process on the memory card 120 attached to the information processing apparatus (client) 100, via the information processing apparatus (client) 100.

The memory card 120 includes the data processing unit that can perform the authentication process, as described above. In step S122, a mutual authentication process is performed between the memory card 120 and the content correspondence information providing server 150.

In this mutual authentication process, the memory card 120 and the content correspondence information providing server 150 transmit their own public key certificates to each other.

The public key certificate of the content correspondence information providing server 150 is the certificate (Certificate) that has the data structure described above with reference to FIG. 3, for example.

That is, this public key certificate is a certificate in which the access right information about each block in the protected area (Protected Area) of the memory card 120 is recorded.

After the authentication process is successfully completed in step S122, the information processing apparatus (client) 100 in step S123 transmits the "content usage permission information (Credential) 172" received earlier from the content usage managing server 130, to the content correspondence information providing server 150.

Upon receipt of the "content usage permission information (Credential) 172" from the information processing apparatus (client) 100, the content correspondence information providing server 150 performs a content usage permission information (Credential) check process in step S124.

This check process is a matching process between the "content usage permission information (Credential) 172" received from the information processing apparatus (client) 100 and the "content usage permission information (Credential)" contained in the data 156 received earlier from the content usage managing server 130.

If these two sets of "content usage permission information (Credential)" are determined to be identical, the matching is determined to be successful, and the next process, which is the process to write the content correspondence information containing the title key into the memory card 120, is performed.

If these two sets of "content usage permission information (Credential)" are determined not to be identical, the matching is determined not to be successful, and the next process, which is the process to write the content correspondence information containing the title key into the memory card 120, is not performed.

In a case where the two sets of "content usage permission information (Credential)" are determined to be identical, and the matching is determined to be successful, the content correspondence information providing server 150 performs the process to write "content correspondence information 173" containing the title key into the memory card 120, which has been authenticated earlier.

The title key writing process is performed on a specific block (PAD block) in the protected area (Protected Area) of the memory card 120. That is, title key writing is performed on the block corresponding to the PAD block identifier contained in the content information issued from the content usage managing server 130.

As described above with reference to FIG. 6, the access right information about the respective blocks in the protected area (Protected Area) of the memory card 120 is recorded in the certificate (Certificate) of each server.

In the earlier authentication process, the control unit or the data processing unit of the memory card 120 checks the server certificate received from the content correspondence information providing server 150.

That is, a check is made to determine whether the block corresponding to the PAD block identifier contained in the content information issued from the content usage managing server 130 is a data writing allowed block for the content correspondence information providing server 150.

The memory card 120 determines whether the block corresponding to the PAD block identifier contained in the content information is recorded as a data writing allowed block for the content correspondence information providing server 150 in the server certificate. Only when this determination result is positive, can the content correspondence information providing server 150 write the title key into the block.

That is, to write the title key for decrypting the encrypted content recorded in the memory card into the protected area (Protected Area) of the memory card, the conditions listed below need to be satisfied.

(1) The authentication process between the content correspondence information providing server 150 and the memory card 120 is successful.

(2) In the content correspondence information providing server 150, matching among the content usage permission information (Credential) received from the content usage managing server 130, the content usage permission information (Credential) received from the information processing apparatus (client) 100, and the content usage permission information (Credential) is confirmed.

(3) The block corresponding to the PAD block identifier recorded in the content information (Offer) issued from the content usage managing server 130 is recorded as a data writing allowed block in the server certificate (Certificate) of the content correspondence information providing server 150. Only when all of these conditions are determined to be satisfied, can the title key be written into the specific block in the protected area (Protected Area) of the memory card.

3-2. Example of a Content Copy Process in the First Embodiment

Referring now to FIG. 7, a process to read content recorded in the disk 110 such as a BD or a DVD attached to the information processing apparatus (client) 100 and record the content into the memory card 120, or a process to perform a content copy recording process, is described.

FIG. 7 shows the respective structures listed below and the process:

(a) The information processing apparatus (client) 100
(b) The memory card (information storage device) 120
(c) The content usage managing server 130
(d) The content correspondence information providing server 150 The content server 140 shown in FIG. 5 is not shown.

In this example, encrypted content 111 stored in the disk 110 attached to the information processing apparatus (client) 100 is read out, and is then recorded into the memory card 120.

The other processes are similar to the processes described above with reference to FIG. 5. For example, the content correspondence information containing the title key to be used in decrypting the encrypted content 111 is acquired from the content correspondence information providing server 150.

As described above with reference to FIGS. 2 through 4, the memory card (information storage device) 120 includes the protected area (Protected Area) 21 on which an access restriction is put so that access is allowed in accordance with access allowance information recorded in a certificate (Certificate), and the general-purpose area (General Purpose Area) 22 on which no such access restrictions are put. Encrypted content and the like are recorded into the general-purpose area (General Purpose Area) 22. The encryption key to be used in decrypting encrypted content is recorded in the protected area (Protected Area) 21.

The sequence in a content copy process is now described.

The differences between the content copy sequence shown in FIG. 7 and the content download sequence shown in FIG. 5 are the portions shown with heavy lines in FIG. 7.

A first difference lies in that the information processing apparatus (client) 100 reads a content ID from the disk 110 and transmits the content ID to the content usage managing server 130.

This is a process for transmitting the information for identifying the content to be copied.

Another difference lies in that the information processing apparatus (client) 100 reads the encrypted content 111 from the disk 110, and, in step S161, performs a copy process to write the encrypted content 111 into the memory card 120.

The rest of the process flow is substantially the same as the process flow described above with reference to FIG. 5.

The process flow shown in FIG. 7 is as follows.

(Step S151)

First, to acquire content, the information processing apparatus (client) 100 having the disk 110 and the memory card 120 attached thereto issues a content usage request to the content usage managing server 130. In issuing this request, the information processing apparatus (client) 100 generates a token 151a based on the data read from the disk 110, further reads a content ID 151b, and transmits the token 151a and the content ID 151b to the content usage managing server 130.

(Step S152)

Having received the content usage request, the content usage managing server 130 performs an authentication process on the information processing apparatus (client)) 100, conducts verification of the received token on condition of successful authentication, identifies the content to be copied based on the received content ID, acquires content information (Offer) corresponding to the identified content from the content information database 131, and transmits the content information (Offer) to the information processing apparatus (client) 100.

The content usage managing server 130 transmits a PAD block identifier contained in this content information (Offer) to the information processing apparatus (client) 100.

The content information and the PAD block identifier are the "content information (Offer) & PAD block identifier 153" shown in FIG. 7.

That is, the content usage managing server 130 transmits the PAD block identifier as storage area designation information for the title key that is the encryption key to be used in content decryption, to the information processing apparatus (client) 100, as in the content download process described above with reference to FIG. 5.

An example of the data in the content information (Offer) provided from the content usage managing server 130 to the information processing apparatus (client) 100 is shown in FIG. 6, which has been described above, and this example data contains the PAD block identifier as the storage area designation information for the title key that is the encryption key to be used in content description.

(Steps S153 and S154)

After receiving the content information containing the PAD block identifier in step S153, the information processing apparatus 100 determines the content to be copied in accordance with the content information in step S154. In a case where content information corresponding to pieces of content is received, for example, the content to be actually copied is selected from among the pieces of content.

(Step S155)

The information processing apparatus 100 then requests content usage permission information (Credential) accompanied by the identifier of the selected content. That is, the "content usage permission information request 154" shown in the drawing is transmitted to the content usage managing server 130.

(Step S156)

Upon receipt of the "content usage permission information request 154" from the information processing apparatus (client) 100, the content usage managing server 130 performs a content usage permission process to generate and transmit "content usage permission information (Credential) 155" to the information processing apparatus (client) 100.

As described above, the "content usage permission information (Credential) 155" is data formed with information about access to the content, access information such as the URL of the content correspondence information such as the title key, a random number generated by the content usage managing server 130, and the like.

In this content usage permission process in step S156, the content usage managing server 130 transmits the data 156 shown in the drawing to the content correspondence information providing server 150 that transmits the title key and the like.

The data 156 contains the following pieces of data:

(a) "content usage permission information (Credential)", which is the same data as the "content usage permission information (Credential) 155" transmitted to the information processing apparatus (client) 100;

(b) the PAD block identifier transmitted to the information processing apparatus (client) 100 earlier; and (c) the title key or the title key identifier. The data 156 containing these pieces of data is transmitted to the content correspondence information providing server 150 that transmits the title key and the like.

(Step S157)

The information processing apparatus (client) 100 receives the content usage permission information (Credential) from the content usage managing server 130.

(Step S161)

The information processing apparatus (client) 100 reads the encrypted content 111 from the disk 110, and records (copies) the read encrypted content into the memory card 120 attached to the information processing apparatus (client) 100.

Here, the encrypted content is recorded into the general-purpose area (General Purpose Area) of the memory card 120.

(Step S171)

The information processing apparatus (client) 100 then transmits an acquisition request for the content correspondence information, or more specifically, the content correspondence information containing the title key to be used in decrypting the copied encrypted content, the usage control information (Usage Rule File), and the like, to the content correspondence information providing server 150.

In transmitting this acquisition request for the content correspondence information, the information processing apparatus (client) 100 transmits the PAD block identifier 172 to the content correspondence information providing server 150, as shown in the drawing.

(Step S172)

Upon receipt of the content correspondence information acquisition request including the PAD block identifier from the information processing apparatus (client) 100, the content correspondence information providing server 150 performs an authentication process on the memory card 120 attached to the information processing apparatus (client) 100, via the information processing apparatus (client) 100.

(Step S173)

After the authentication process is successfully completed, the information processing apparatus (client) 100 transmits the "content usage permission information (Credential) 172" received earlier from the content usage managing server 130, to the content correspondence information providing server 150.

(Step S174)

Upon receipt of the "content usage permission information (Credential) 172" from the information processing apparatus (client) 100, the content correspondence information providing server 150 performs a content usage permission information (Credential) check process.

This check process is a matching process between the "content usage permission information (Credential) 172" received from the information processing apparatus (client) 100 and the "content usage permission information (Credential)" contained in the data 156 received earlier from the content usage managing server 130.

If these two sets of "content usage permission information (Credential)" are determined to be identical, the matching is determined to be successful, and the next process, which is the process to write the content correspondence information containing the title key into the memory card 120, is performed.

If these two sets of "content usage permission information (Credential)" are determined not to be identical, the matching is determined not to be successful, and the next process, which is the process to write the content correspondence information containing the title key into the memory card 120, is not performed.

In a case where the two sets of "content usage permission information (Credential)" are determined to be identical, and the matching is determined to be successful, the content correspondence information providing server 150 performs the process to write "content correspondence information 173" containing the title key into the memory card 120, which has been authenticated earlier.

The title key writing process is performed on a specific block (PAD block) in the protected area (Protected Area) of the memory card 120. That is, title key writing is performed on the block corresponding to the PAD block identifier contained in the content information issued from the content usage managing server 130.

As described above with reference to FIG. 6, the access right information about the respective blocks in the protected area (Protected Area) of the memory card 120 is recorded in the certificate (Certificate) of each server.

In the earlier authentication process, the control unit or the data processing unit of the memory card 120 checks the server certificate received from the content correspondence information providing server 150.

That is, a check is made to determine whether the block corresponding to the PAD block identifier contained in the content information issued from the content usage managing server 130 is a data writing allowed block for the content correspondence information providing server 150.

The memory card 120 determines whether the block corresponding to the PAD block identifier contained in the content information is a data writing allowed block for the content correspondence information providing server 150. Only when the block is determined to be a data writing allowed block, can the content correspondence information providing server 150 write the title key into the block.

That is, as in the content download process described above with reference to FIG. 5, to write the title key for decrypting the encrypted content recorded in the memory card into the protected area (Protected Area) of the memory card, the conditions listed below need to be satisfied in the content copy process shown in FIG. 7.

(1) The authentication process between the content correspondence information providing server 150 and the memory card 120 is successful.

(2) In the content correspondence information providing server 150, matching among the content usage permission information (Credential) received from the content usage managing server 130, the content usage permission information (Credential) received from the information processing apparatus (client) 100, and the content usage permission information (Credential) is confirmed.

(3) The block corresponding to the PAD block identifier recorded in the content information (Offer) issued from the content usage managing server 130 is recorded as a data writing allowed block in the server certificate (Certificate) of the content correspondence information providing server 150.

Only when all of these conditions are determined to be satisfied, can the title key be written into the specific block in the protected area (Protected Area) of the memory card.

3-3. Communication Sequence Among the Respective Components in the First Embodiment A content download process has been described with reference to FIG. 5, a content copy process has been described with reference to FIG. 7, and the process sequences in cases where these processes are performed have also been described.

Figure 8:
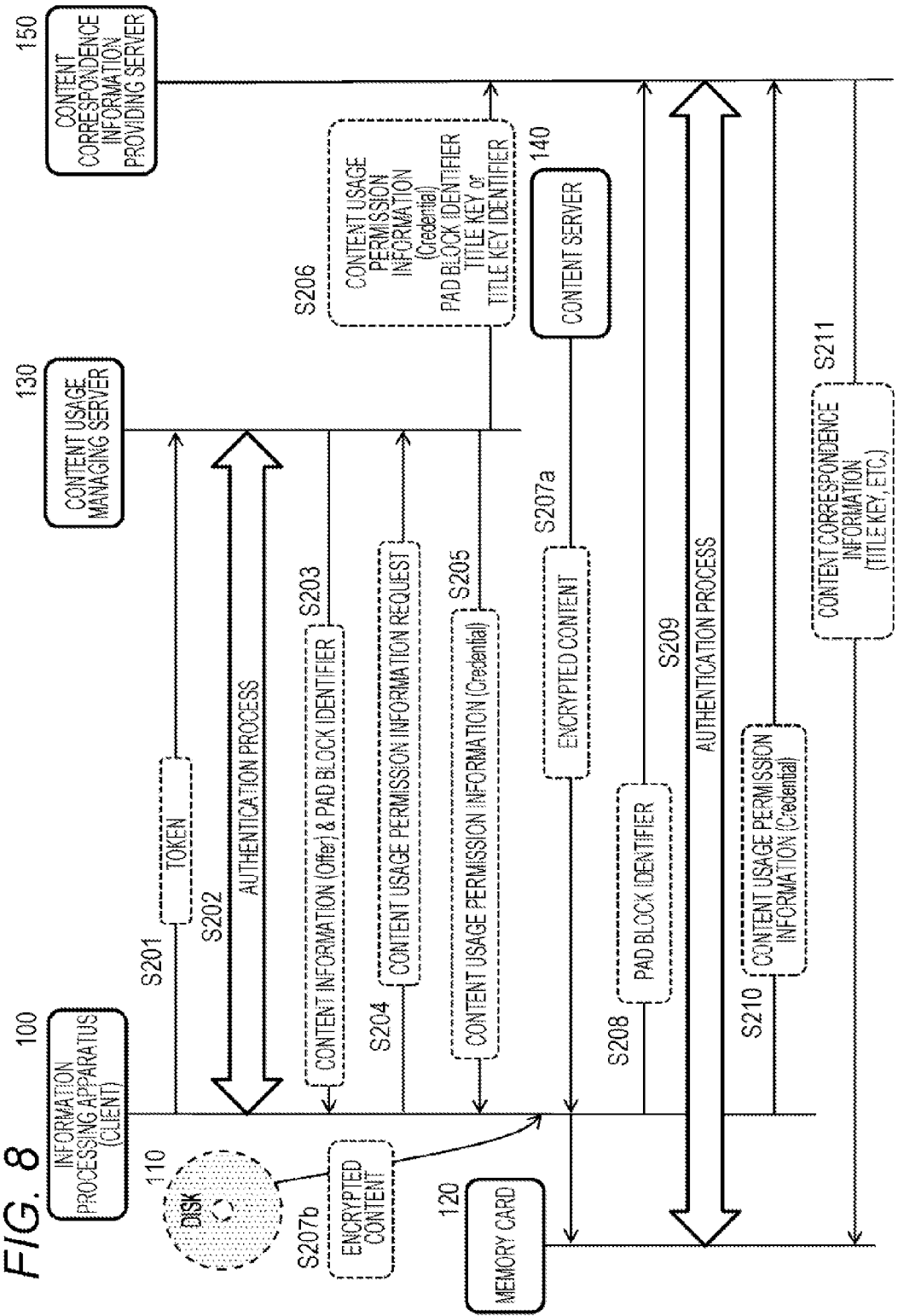
FIG. 8 is a diagram for explaining a sequence in which a PAD block identifier as the information for designating a title key storage block is provided in conjunction with content information (Offer).

FIG. 8 is a diagram collectively showing the communication sequence to be performed among the respective components in a case where a content download process or a content copy process is performed.

The processes in the respective steps shown in FIG. 8 are as follows.

(Step S201)

The information processing apparatus (client) 100 transmits a token indicating a content usage request to the content usage managing server 130.

(Step S202)

An authentication process is performed between the information processing apparatus (client) 100 and the content usage managing server 130.

(Step S203)

The content usage managing server 130 transmits content information (Offer) containing a PAD block identifier to the information processing apparatus (client) 100 on condition of successful authentication.

(Step S204)

The information processing apparatus (client) 100 transmits a content usage permission information request to the content usage managing server 130.

(Step S205)

The content usage managing server 130 transmits content usage permission information (Credential) to the content correspondence information providing server 150.

(Step S206)

The content usage managing server 130 transmits the content usage permission information (Credential), the PAD block identifier, and the title key or the title key identifier to the information processing apparatus (client) 100.

(Steps S207a and S207b)

Step S207a: the information processing apparatus (client) 100 downloads content from the content server 140, or step S207b: the information processing apparatus (client) 100 copies content from the disk 110 and writes the content into the memory card 120.

The encrypted content is written into the general-purpose area (General Purpose Area) of the memory card 120.

(Step S208)

The information processing apparatus (client) 100 transmits the PAD block identifier to the content correspondence information providing server 150.

That is, the PAD block identifier that is determined as the title key writing block by the content usage managing server 130 and is received from the content usage managing server 130 is transmitted.

(Step S209)

An authentication process is performed between the memory card 120 and the content correspondence information providing server 150.

(Step S210)

The information processing apparatus (client) 100 transmits the content usage permission information (Credential) to the content correspondence information providing server 150.

(Step S211)

The content correspondence information providing server 150 writes the title key into the specific block in the protected area (Protected Area) identified by the PAD block identifier of the memory card 120 on condition of successful authentication and successful matching of the content usage permission information (Credential). Further, other content correspondence information is recorded.

Through the above sequence, the data described below is recorded into the memory card 120.

Downloaded encrypted content or copied encrypted content is recorded into the general-purpose area (General Purpose Area).

The title key to be used in decrypting the encrypted content is recorded into the block corresponding to the PAD block identifier designated by the content usage managing server 130 among the blocks in the protected area (Protected Area).

The title key to be recorded into the block in the protected area (Protected Area) may be the data of the title key or converted data of the title key. For example, the title key may be stored as a converted title key subjected to conversion (XOR operation or encryption) with a key (a sub-key) that can be used by the information processing apparatus (client) 100.

In such a setting, the information processing apparatus (client) 100 acquires the converted title key from the block in the protected area (Protected Area), acquires the title key by performing operation or a decryption process on the converted title key, and decrypts the encrypted content by using the acquired title key.

4. (Second Embodiment) Example Processes of Notification of the Block Identifier of a Block for Key Writing in Conjunction with Content Usage Permission Information (Credential) in a Content Recording Process Performed on a Memory Card Next, an example process for a content usage managing server to make notification of the block identifier of a block for key writing in conjunction with content usage permission information (Credential) is described as a second embodiment.

4-1. Example of a Content Download Process in the Second Embodiment

Figure 9:
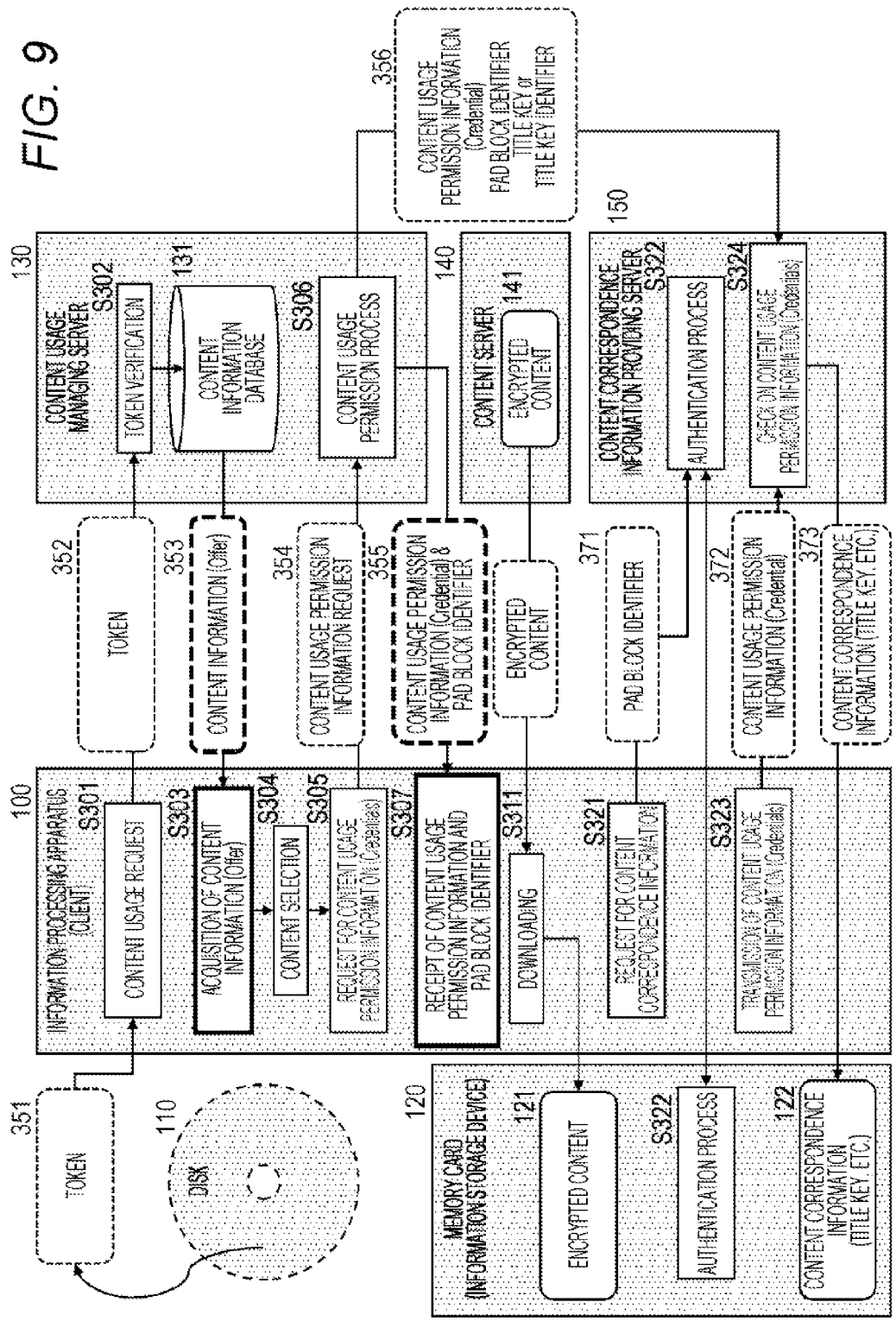
FIG. 9 is a diagram for explaining an example of an encrypted content download recording process.

Referring first to FIG. 9, a specific example of a process to be performed in a case where encrypted content is downloaded and recorded into a memory card is described.

FIG. 9 shows the respective structures listed below and the process:

(a) an information processing apparatus (client) 100;

(b) a memory card (information storage device) 120;

(c) a content usage managing server 130;

(d) a content server 140; and (e) a content correspondence information providing server 150.

Like the process described above in the description of the first embodiment with reference to FIG. 5, the process shown in FIG. 9 is a downloaded content recording process.

A difference between the process shown in FIG. 9 and the process shown in FIG. 5 is the timing of notification of a PAD block identifier from the content usage managing server 130 to the information processing apparatus (client) 100.

In the first embodiment described above, the content usage managing server 130 incorporates a PAD block identifier as the information for designating the title key storage block into content information (Offer), and then provides the content information (Offer) to the information processing apparatus (client) 100.

In the example process shown in FIG. 9, the content usage managing server 130 incorporates a PAD block identifier not into content information (Offer) but into later content usage permission information, and notifies the information processing apparatus (client) 100 of the title key recording block.

The example process shown in FIG. 9 differs from the example process shown in FIG. 5 in this aspect.

The sequence shown in FIG. 9 is as follows.

(Step S301)

First, to acquire content, the information processing apparatus (client) 100 having the memory card 120 attached thereto issues a content usage request to the content usage managing server 130. For example, a token 351 based on data read from a web page provided by a service provider or a disk 110 is generated, and a token 352 is transmitted to the content usage managing server 130.

(Step S302)

Having received the content usage request, the content usage managing server 130 performs an authentication process on the information processing apparatus (client) 100, conducts token verification on condition of successful authentication, selects available content based on the token, acquires content information (Offer) from a content information database 131, and transmits the content information (Offer) to the information processing apparatus (client) 100. This content information (Offer) is the content information (Offer) 353 shown in the drawing.

This embodiment differs from the foregoing embodiment in that the content information (Offer) 353 does not contain the PAD block identifier that is the information for designating the title key storage block.

(Steps S303 and S304)

Having received the content information, the information processing apparatus 100 determines the content to be acquired in accordance with the content information. In a case where content information corresponding to pieces of content is received, for example, the content to be actually acquired is selected from among the pieces of content.

(Step S305)

The information processing apparatus 100 then requests content usage permission information (Credential) accompanied by the identifier of the selected content. That is, the "content usage permission information request 354" shown in the drawing is transmitted to the content usage managing server 130.

(Step S306)

Upon receipt of the "content usage permission information request 354" from the information processing apparatus (client) 100, the content usage managing server 130 performs a content usage permission process to generate and transmit "content usage permission information (Credential) 355" to the information processing apparatus (client) 100.

In this embodiment, the PAD block identifier that is the information for designating the title key storage block is incorporated into the content usage permission information (Credential) 355, and is transmitted.

That is, the content usage managing server 130 transmits the PAD block identifier as storage area designation information for the title key that is the encryption key to be used in content decryption, in conjunction with the content usage permission information (Credential) 355, to the information processing apparatus (client) 100. The content usage managing server 130 can determine the PAD block identifier based on the selected content.

The PAD block identifier is the identifier of a block that is a sectioned area in the protected area ((Protected Area) of the memory card described above with reference to FIGS. 2 and 4, and is the information for designating the storage block for the encryption key (title key) to be usedindecrypting encrypted content.

As described above, the content usage managing server 130 notifies the information processing apparatus 100 of the PAD block identifier, to designate the block in the protected area (Protected Area) of the memory card into which the key (title key) for decrypting the encrypted content that is about to be acquired by the information processing apparatus (client) is to be stored.

That is, the content usage managing server 130 determines the storage area (block) for the encryption key (title key) to be used in content decryption.

Accordingly, the block determined by the content usage managing server 130 becomes available as the title key storage area.

The "content usage permission information (Credential) 355" contains information about access to the content, access information such as the URL of the content correspondence information such as the title key, a random number generated by the content usage managing server 130, and the like, as well as the PAD block identifier.

In this content usage permission process in step S306, the content usage managing server 130 transmits the data 356 shown in the drawing to the content correspondence information providing server 150 that transmits the title key and the like, as in the example processes described above.

The data 356 contains the following pieces of data:

(a) "content usage permission information (Credential)", which is the same data as the "content usage permission information (Credential) 355" transmitted to the information processing apparatus (client) 100;

(b) the PAD block identifier; and (c) the title key or the title key identifier. The data 356 containing these pieces of data is transmitted to the content correspondence information providing server 150 that transmits the title key and the like.

(Step S307)

In step S307, the information processing apparatus (client) 100 receives the content usage permission information (Credential) from the content usage managing server 130.

(Step S311)

The information processing apparatus (client) 100 acquires or downloads the content from the content server 140, and records the content into the memory card 120.

Here, the encrypted content is recorded into the general-purpose area (General Purpose Area) of the memory card 120.

(Step S321)

The information processing apparatus (client) 100 then transmits an acquisition request for the content correspondence information, or more specifically, the content correspondence information containing the title key to be used in decrypting the acquired encrypted content, the usage control information (Usage Rule File), and the like, to the content correspondence information providing server 150.

In transmitting this acquisition request for the content correspondence information, the information processing apparatus (client) 100 transmits a PAD block identifier 372 to the content correspondence information providing server 150, as shown in the drawing.

This PAD block identifier 372 is the PAD block identifier received in conjunction with the content usage permission information (Credential) received from the content usage managing server 130.

(Step S322)

Upon receipt of the content correspondence information acquisition request including the PAD block identifier 371 from the information processing apparatus (client) 100, the content correspondence information providing server 150 performs an authentication process on the memory card 120 attached to the information processing apparatus (client) 100, via the information processing apparatus (client) 100.

(Step S323)

After the authentication process is successfully completed, the information processing apparatus (client) 100 transmits the "content usage permission information (Credential) 372" received earlier from the content usage managing server 130, to the content correspondence information providing server 150.

(Step S324)

Upon receipt of the "content usage permission information (Credential) 372" from the information processing apparatus (client) 100, the content correspondence information providing server 150 performs a content usage permission information (Credential) check process.

This check process is a matching process between the "content usage permission information (Credential) 372" received from the information processing apparatus (client)

100 and the "content usage permission information (Credential)" contained in the data 356 received earlier from the content usage managing server 130.

If these two sets of "content usage permission information (Credential)" are determined to be identical, the matching is determined to be successful, and the next process, which is the process to write the content correspondence information containing the title key into the memory card 120, is performed.

If these two sets of "content usage permission information (Credential)" are determined not to be identical, the matching is determined not to be successful, and the next process, which is the process to write the content correspondence information containing the title key into the memory card 120, is not performed.

In a case where the two sets of "content usage permission information (Credential)" are determined to be identical, and the matching is determined to be successful, the content correspondence information providing server 150 performs the process to write "content correspondence information 373" containing the title key into the memory card 120, which has been authenticated earlier.

The title key writing process is performed on a specific block (PAD block) in the protected area (Protected Area) of the memory card 120. That is, title key writing is performed on the block corresponding to the PAD block identifier determined by the content usage managing server 130.

In the second embodiment, to write the title key for decrypting the encrypted content recorded in the memory card into the protected area (Protected Area) of the memory card, the conditions listed below need to be satisfied as in the above described first embodiment.

(1) The authentication process between the content correspondence information providing server 150 and the memory card 120 is successful.

(2) In the content correspondence information providing server 150, matching among the content usage permission information (Credential) received from the content usage managing server 130, the content usage permission information (Credential) received from the information processing apparatus (client) 100, and the content usage permission information (Credential) is confirmed.

(3) The block corresponding to the PAD block identifier recorded in the content usage permission information (Credential) issued from the content usage managing server 130 is recorded as a data writing allowed block in the server certificate (Certificate) of the content correspondence information providing server 150.

Only when all of these conditions are determined to be satisfied, can the title key be written into the specific block in the protected area (Protected Area) of the memory card.

4-2. Example of a Content Copy Process in the Second Embodiment

Figure 10:
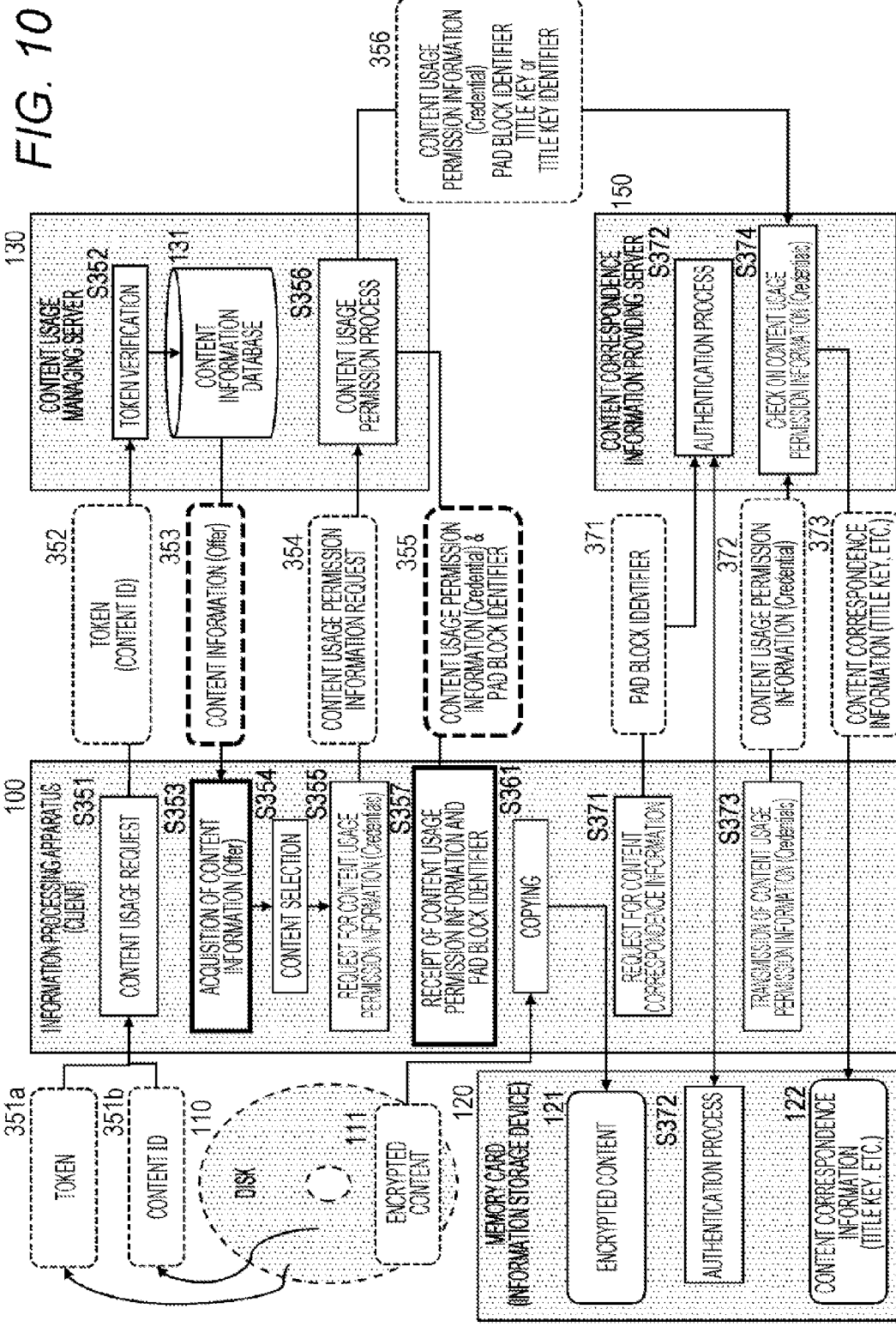
FIG. 10 is a diagram for explaining an example of an encrypted content copy recording process.

Referring now to FIG. 10, a process to read content recorded in the disk 110 such as a BD or a DVD attached to the information processing apparatus (client) 100 and record the content into the memory card 120, or a process to perform a content copy recording process, is described.

FIG. 10 shows the respective structures listed below and the process:

(a) The information processing apparatus (client) 100
(b) The memory card (information storage device) 120
(c) The content usage managing server 130
(d) The content correspondence information providing server 150 The content server 140 shown in FIG. 9 is not shown.

In this example, encrypted content 111 stored in the disk 110 attached to the information processing apparatus (client) 100 is read and is recorded into the memory card 120.

The other processes are similar to the processes described above with reference to FIG. 9. For example, the content correspondence information containing the title key to be used in decrypting the encrypted content 111 is acquired from the content correspondence information providing server 150.

As described above with reference to FIGS. 2 through 4, the memory card (information storage device) 120 includes the protected area (Protected Area) 21 on which an access restriction is put so that access is allowed in accordance with access allowance information recorded in a certificate, and the general-purpose area (General Purpose Area) 22 on which no such access restrictions are put. Encrypted content and the like are recorded into the general-purpose area (General Purpose Area) 22. The encryption key to be used in decrypting encrypted content is recorded in the protected area (Protected Area) 21.

The sequence in a content copy process is now described.

Like the sequence shown in FIG. 7 and described above as the first embodiment, the content copy sequence shown in FIG. 10 is a copied content recording process.

A difference from FIG. 7 is the timing of notification of a PAD block identifier from the content usage managing server 130 to the information processing apparatus (client) 100.

In the first embodiment described above, the content usage managing server 130 incorporates a PAD block identifier into content information (Offer), and then notifies the information processing apparatus (client) 100 of the title key recording block.

In the example process shown in FIG. 10, the content usage managing server 130 incorporates a PAD block identifier not into content information (Offer) but into later content usage permission information, and notifies the information processing apparatus (client) 100 of the title key recording block.

The example process shown in FIG. 10 differs from the example process shown in FIG. 7 in this aspect.

The process flow shown in FIG. 10 is as follows.

(Step S351)

First, to acquire content, the information processing apparatus (client) 100 having the disk 110 and the memory card 120 attached thereto issues a content usage request to the content usage managing server 130. In issuing this request, the information processing apparatus (client) 100 reads a token 351a and a content ID 351b from the disk 110, and transmits the token 351a and the content ID 351b to the content usage managing server 130.

(Step S352)

Having received the content usage request, the content usage managing server 130 performs an authentication process on the information processing apparatus (client) 100, conducts verification of the received token on condition of successful authentication, identifies the content to be copied based on the received content ID, acquires content information (Offer) corresponding to the identified content from the content information database 131, and transmits the content information (Offer) to the information processing apparatus (client) 100. This content information (Offer) is the content information (Offer) 353 shown in the drawing.

This embodiment differs from the foregoing embodiment in that the content information (Offer) 353 does not contain the PAD block identifier that is the information for designating the title key storage block.

(Steps S353 and S354)

After receiving the content information containing the PAD block identifier in step S353, the information processing apparatus 100 determines the content to be copied in accordance with the content information in step S354. In a case where content information corresponding to pieces of content is received, for example, the content to be actually copied is selected from among the pieces of content.

(Step S355)

The information processing apparatus 100 then requests content usage permission information (Credential) accompanied by the identifier of the selected content. That is, the "content usage permission information request 154" shown in the drawing is transmitted to the content usage managing server 130.

(Step S356)

Upon receipt of the "content usage permission information request 354" from the information processing apparatus (client) 100, the content usage managing server 130 performs a content usage permission process to generate and transmit "content usage permission information (Credential) 355" to the information processing apparatus (client) 100.

In this embodiment, the PAD block identifier that is the information for designating the title key storage block is incorporated into the content usage permission information (Credential) 355, and is transmitted.

That is, the content usage managing server 130 transmits the PAD block identifier as storage area designation information for the title key that is the encryption key to be used in content decryption, in conjunction with the content usage permission information (Credential) 355, to the information processing apparatus (client) 100. The content usage managing server 130 can determine the PAD block identifier based on the selected content.

The "content usage permission information (Credential) 355" contains information about access to the content, access information such as the URL of the content correspondence information such as the title key, a random number generated by the content usage managing server 130, and the like, as well as the PAD block identifier.

In this content usage permission process in step S356, the content usage managing server 130 transmits the data 356 shown in the drawing to the content correspondence information providing server 150 that transmits the title key and the like, as in the example processes described above.

The data 356 contains the following pieces of data:

(a) "content usage permission information (Credential)", which is the same data as the "content usage permission information (Credential) 355" transmitted to the information processing apparatus (client) 100;

(b) the PAD block identifier; and (c) the title key or the title key identifier. The data 356 containing these pieces of data is transmitted to the content correspondence information providing server 150 that transmits the title key and the like.

(Step S357)

The information processing apparatus (client) 100 receives the content usage permission information (Credential) from the content usage managing server 130.

(Step S361)

The information processing apparatus (client) 100 reads the encrypted content 111 from the disk 110, and records (copies) the read encrypted content into the memory card 120 attached to the information processing apparatus (client) 100.

Here, the encrypted content is recorded into the general-purpose area (General Purpose Area) of the memory card 120.

(Step S371)

The information processing apparatus (client)) 100 then transmits an acquisition request for the content correspondence information, or more specifically, the content correspondence information containing the title key to be used in decrypting the copied encrypted content, the usage control information (Usage Rule File), and the like, to the content correspondence information providing server 150.

In transmitting this acquisition request for the content correspondence information, the information processing apparatus (client) 100 transmits the PAD block identifier 372 to the content correspondence information providing server 150, as shown in the drawing.

(Step S372)

Upon receipt of the content correspondence information acquisition request including the PAD block identifier from the information processing apparatus (client) 100, the content correspondence information providing server 150 performs an authentication process on the memory card 120 attached to the information processing apparatus (client) 100, via the information processing apparatus (client) 100.

(Step S373)

After the authentication process is successfully completed, the information processing apparatus (client) 100 transmits the "content usage permission information (Credential) 372" received earlier from the content usage managing server 130, to the content correspondence information providing server 150.

(Step S374)

Upon receipt of the "content usage permission information (Credential) 372" from the information processing apparatus (client) 100, the content correspondence information providing server 150 performs a content usage permission information (Credential) check process.

This check process is a matching process between the "content usage permission information (Credential) 372" received from the information processing apparatus (client) 100 and the "content usage permission information (Credential)" contained in the data 356 received earlier from the content usage managing server 130.

If these two sets of "content usage permission information (Credential)" are determined to be identical, the matching is determined to be successful, and the next process, which is the process to write the content correspondence information containing the title key into the memory card 120, is performed.

If these two sets of "content usage permission information (Credential)" are determined not to be identical, the matching is determined not to be successful, and the next process, which is the process to write the content correspondence information containing the title key into the memory card 120, is not performed.

In a case where the two sets of "content usage permission information (Credential)" are determined to be identical, and the matching is determined to be successful, the content correspondence information providing server 150 performs the process to write "content correspondence information 373" containing the title key into the memory card 120, which is attached to the information processing apparatus (client) 100 and has been authenticated earlier.

The title key writing process is performed on a specific block (PAD block) in the protected area (Protected Area) of the memory card 120. That is, title key writing is performed on the block corresponding to the PAD block identifier determined by the content usage managing server 130.

As in the content download process described above with reference to FIG. 9, to write the title key for decrypting the encrypted content recorded in the memory card into the protected area (Protected Area) of the memory card, the conditions listed below need to be satisfied in the content copy process shown in FIG. 10.

(1) The authentication process between the content correspondence information providing server 150 and the memory card 120 is successful.

(2) In the content correspondence information providing server 150, matching among the content usage permission information (Credential) received from the content usage managing server 130, the content usage permission information (Credential) received from the information processing apparatus (client) 100, and the content usage permission information (Credential) is confirmed.

(3) The block corresponding to the PAD block identifier determined by the content usage managing server 130 is recorded as a data writing allowed block in the server certificate (Certificate) of the content correspondence information providing server 150.

Only when all of these conditions are determined to be satisfied, can the title key be written into the specific block in the protected area (Protected Area) of the memory card.

4-3. Communication Sequence Among the Respective Components in the Second Embodiment A content download process has been described with reference to FIG. 9, a content copy process has been described with reference to FIG. 10, and the process sequences in cases where these processes are performed have also been described as the second embodiment.

Figure 11:
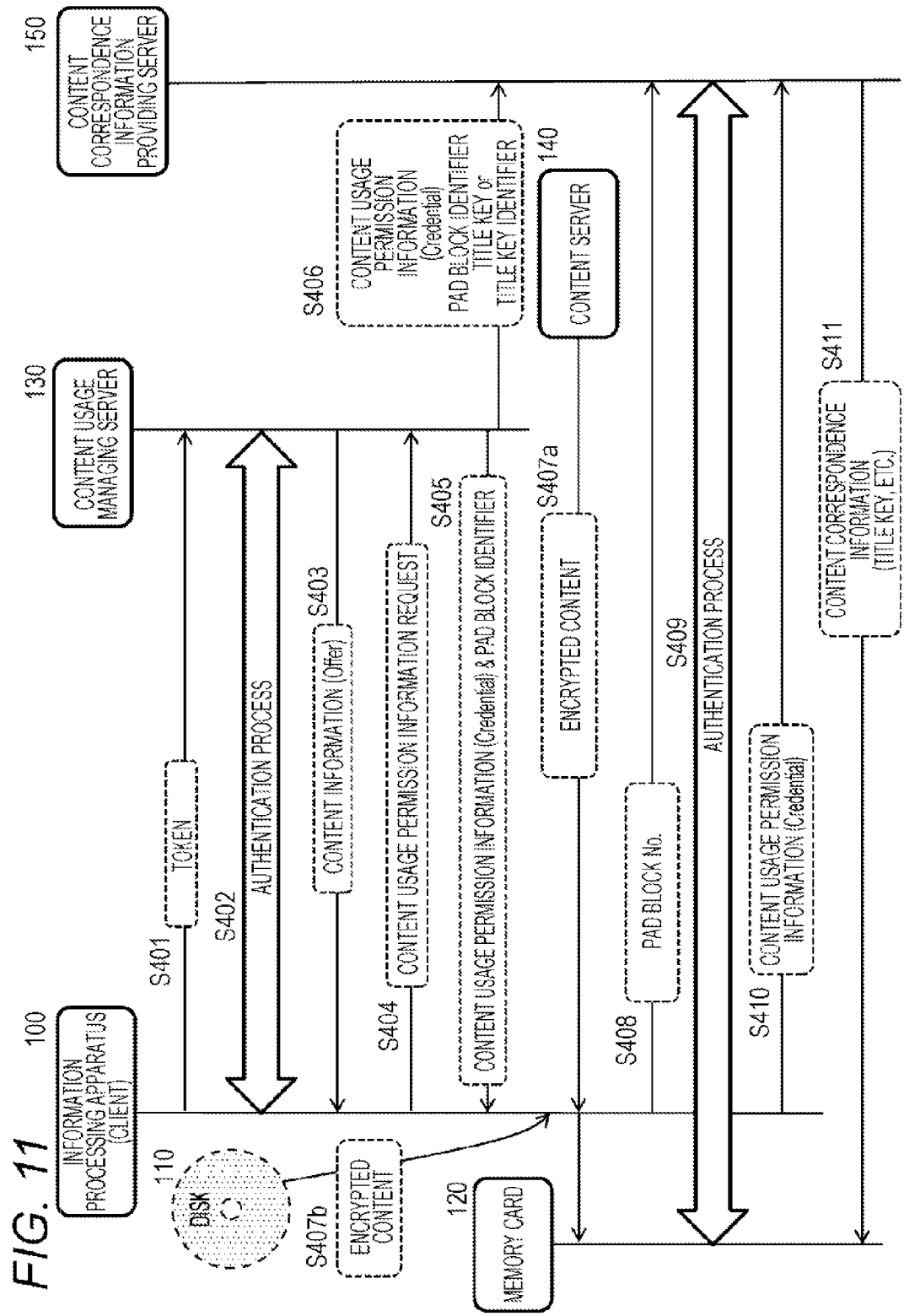
FIG. 11 is a diagram for explaining a sequence in which a PAD block identifier as the information for designating a title key storage block is provided in conjunction with content usage permission information (Credential).

FIG. 11 is a diagram schematically showing the communication sequence to be performed among the respective components in a case where a content download process or a content copy process according to the second embodiment is performed.

The processes in the respective steps shown in FIG. 11 are as follows.

(Step S401)
The information processing apparatus (client) 100 transmits a token indicating a content usage request to the content usage managing server 130.

(Step S402)
An authentication process is performed between the information processing apparatus (client) 100 and the content usage managing server 130.

(Step S403)
The content usage managing server 130 transmits content information (Offer) to the information processing apparatus (client) 100 on condition of successful authentication.

(Step S404)
The information processing apparatus (client) 100 transmits a content usage permission information request to the content usage managing server 130.

(Step S405)
The content usage managing server 130 transmits content usage permission information (Credential) to the content correspondence information providing server 150. In doing so, the content usage managing server 130 also transmits a PAD block identifier that is the information for designating the title key storage block.

(Step S406)
The content usage managing server 130 transmits the content usage permission information (Credential), the PAD block identifier, and the title key or the title key identifier to the information processing apparatus (client) 100.

(Steps S407*a* and S407*b*)
Step S407*a*: the information processing apparatus (client) 100 downloads content from the content server 140, or
step S407*b*: the information processing apparatus (client) 100 copies content from the disk 110 and writes the content into the memory card 120.

The encrypted content is written into the general-purpose area (General Purpose Area) of the memory card 120.

(Step S408)
The information processing apparatus (client) 100 transmits the PAD block identifier to the content correspondence information providing server 150.

That is, the PAD block identifier that is determined as the title key writing block by the content usage managing server 130 and is received from the content usage managing server 130 is transmitted.

(Step S409)
An authentication process is performed between the memory card 120 and the content correspondence information providing server 150.

(Step S410)
The information processing apparatus (client) 100 transmits the content usage permission information (Credential) to the content correspondence information providing server 150.

(Step S411)
The content correspondence information providing server 150 writes the title key into the block identified by the PAD block identifier of the memory card 120 on condition of successful authentication and successful matching of the content usage permission information (Credential).

Through the above sequence, the data described below is recorded into the memory card 120.

Downloaded encrypted content or copied encrypted content is recorded into the general-purpose area (General Purpose Area).

The title key to be used in decrypting the encrypted content is recorded into the block corresponding to the PAD block identifier designated by the content usage managing server 130 among the blocks in the protected area (Protected Area).

The title key to be recorded into the designated block in the protected area (Protected Area) may be the title key as it is or converted data of the title key. For example, the title key may be stored as a converted title key subjected to conversion (XOR operation or encryption) with a key (a sub-key) that can be used by the information processing apparatus (client) 100.

In such a setting, the information processing apparatus (client) 100 acquires the converted title key from the block in the protected area (Protected Area), acquires the title key by performing operation or a decryption process on the converted title key, and decrypts the encrypted content by using the acquired title key.

5. Example Hardware Configurations of Respective Apparatuses

Figure 12:
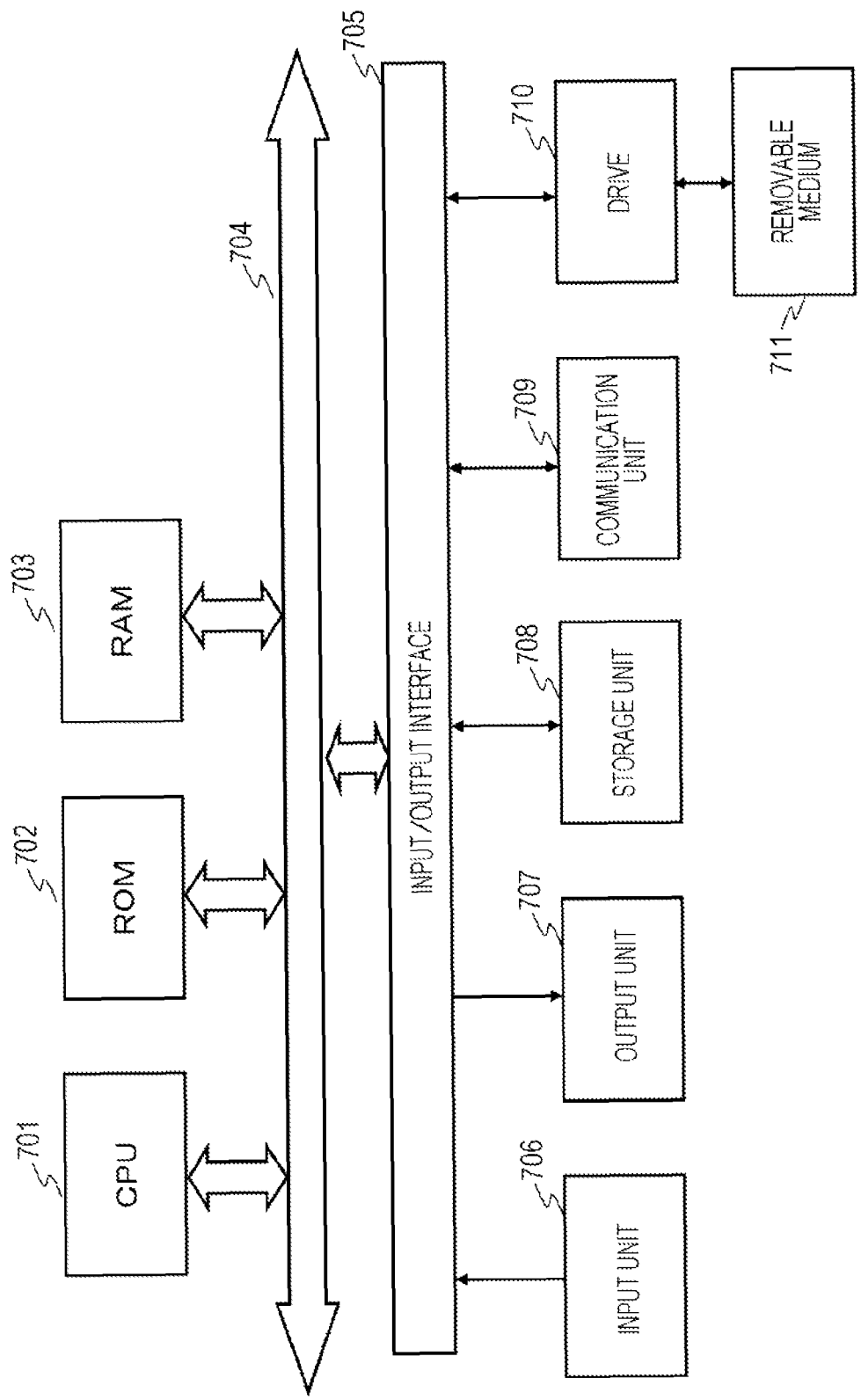
FIG. 12 is a diagram for explaining an example hardware configuration of an information processing apparatus.

Lastly, example hardware configurations of apparatuses that perform the above described processes are described, with reference to FIG. 12 and another.

Referring to FIG. 12, an example hardware configuration of an information recording apparatus or an information reproduction apparatus as a client that is connected to a server or has a memory card attached thereto, and performs data recording or reproduction is first described.

A CPU (Central Processing Unit) 701 functions as a data processing unit that performs various kinds of processes in accordance with a program stored in a ROM (Read Only Memory) 702 or a storage unit 708. For example, the CPU 701 performs the server-client communication processes described above in the respective embodiments, a process to record received data into a memory card (a removable medium 711 in the drawing), a process to reproduce data from the memory card (the removable medium 711 in the drawing), or the like. The program to be executed by the CPU 701 and data are stored in a RAM (Random Access Memory) 703 as appropriate. The CPU 701, the ROM 702, and the RAM 703 are connected to one another by a bus 704.

The CPU 701 is connected to an input/output interface 705 via the bus 704, and an input unit 706 formed with various kinds of switches, a keyboard, a mouse, a microphone, and the like, and an output unit 707 formed with a display, a speaker, and the like are also connected to the input/output interface 705. The CPU 701 performs various kinds of processes in accordance with instructions that are input through the input unit 706, and outputs processing results to the output unit 707, for example.

The storage unit 708 connected to the input/output interface 705 is formed with a hard disk, for example, and stores the program to be executed by the CPU 701 and various kinds of data. A communication unit 709 communicates with an external device via a network such as the Internet or a local area network.

A drive 710 connected to the input/output interface 705 drives the removable medium 711 that is a magnetic disk, an optical disk, a magnetooptical disk, a semiconductor memory, or the like, and acquires various kinds of data such as recorded content, key information, and a program. For example, with the use of data processing in accordance with an acquired program, content, or key data, key generation or content encryption, recording, decryption, reproduction, or the like is performed in accordance with the data processing or the recording/reproducing program being executed by the CPU.

Figure 13:
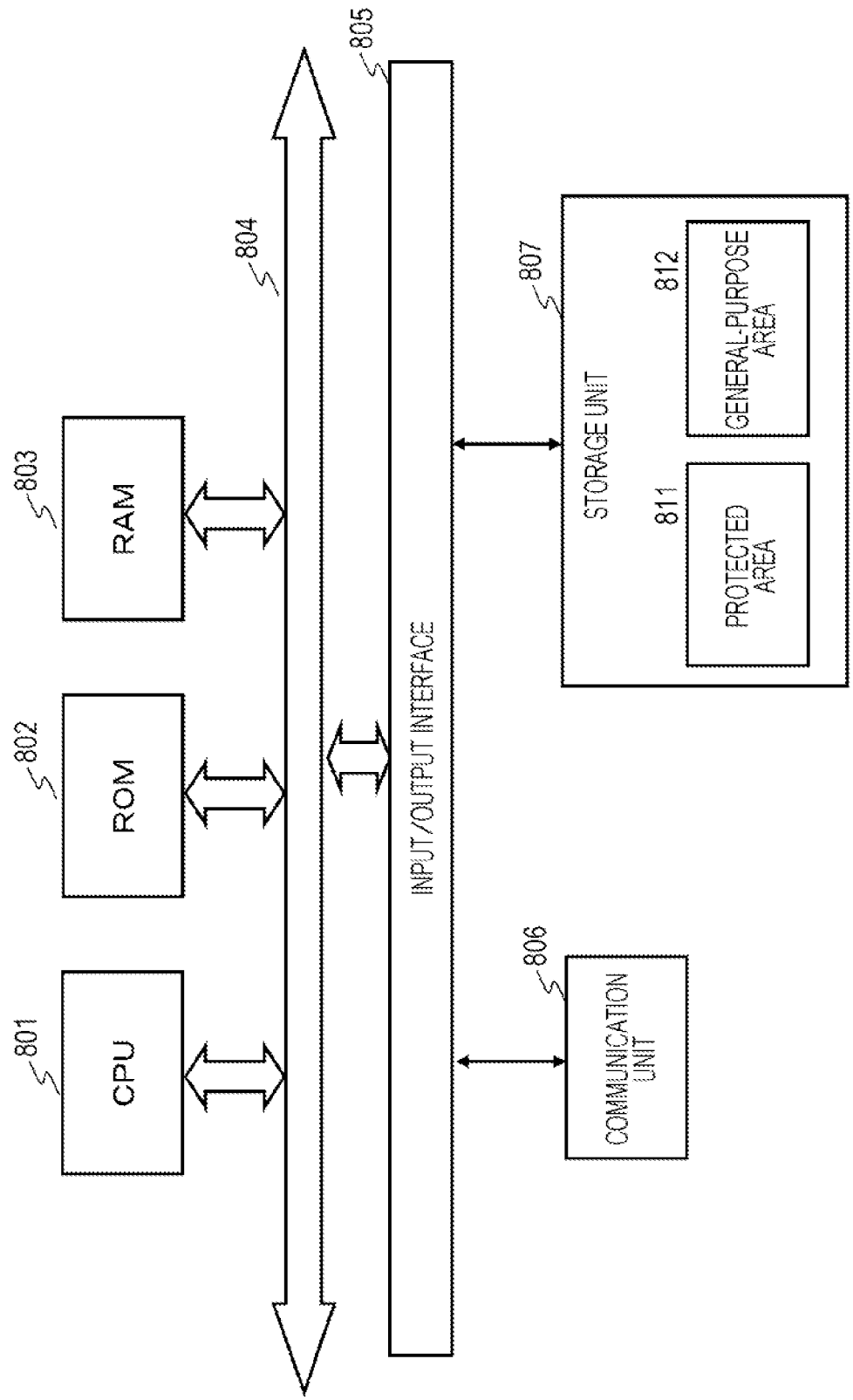
FIG. 13 is a diagram for explaining an example hardware configuration of an information storage device such as a memory card.

FIG. 13 shows an example hardware configuration of a memory card.

A CPU (Central Processing Unit) 801 functions as a data processing unit that performs various kinds of processes in accordance with a program stored in a ROM (Read Only Memory) 802 or a storage unit 807. For example, the CPU 801 performs the communication processes described above in the respective embodiments with a server and a host device such as a recording apparatus or a reproducing apparatus, a process to write and read data into a storage unit 807, a process to determine whether to allow access to respective blocks that are the sectioned areas in a protected area 811 of the storage unit 807, and the like. The program to be executed by the CPU 801 and data are stored in a RAM (Random Access Memory) 803 as appropriate. The CPU 801, the ROM 802, and the RAM 803 are connected to one another by a bus 804.

The CPU 801 is connected to an input/output interface 805 via the bus 804, and a communication unit 806 and the storage unit 807 are also connected to the input/output interface 805.

The communication unit 804 connected to the input/output interface 805 performs communication with a server and a host device, for example. The storage unit 807 is a data storage area, and includes the protected area (Protected Area) 811 on which an access restriction is put as described above, and a general-purpose area 812 where data recording and reading can be freely performed.

6. Summary of the Structure of the Present Disclosure

Embodiments of the present disclosure have been described so far by way of specific examples. However, it is obvious that those skilled in the art can make modifications to and substitutions of the embodiments without departing from the scope of the present disclosure. That is, the present invention is disclosed in the form of examples, and the above description should not be interpreted in a restrictive manner. The claims should be taken into account in understanding the subject matter of the present disclosure.

The technology disclosed in this specification may also be embodied in the structures described below.

(1) An information processing apparatus including:

a data processing unit; and a data storage unit that stores encrypted content and data containing an encryption key to be used in decrypting the encrypted content, wherein the data storage unit having a protected area including blocks that allow access thereto based on an access right check made on each of the blocks, the data processing unit inputs a block identifier from a content usage managing server, the block identifier being information for designating a block for storing the encryption key, transmits the input block identifier to a content correspondence information providing server that performs a process to write the encryption key, and performs a process to write the encrypted content into the data storage unit, the data storage unit includes an in-storage data processing unit configured to make the access right check to determine whether the content correspondence information providing server is a server allowed to write data into the block corresponding to the block identifier based on a server certificate set for the content correspondence information providing server, and the in-storage data processing unit allows the content correspondence information providing server to write the encryption key into the block in the protected area when an access right is confirmed.

(2) The information processing apparatus of (1), wherein the data processing unit inputs content information about the encrypted content from the content usage managing server, and inputs the block identifier in conjunction with the content information.

(3) The information processing apparatus of (1) or (2), wherein the data processing unit inputs content usage permission information about the encrypted content from the content usage managing server, and inputs the block identifier in conjunction with the content usage permission information.

(4) The information processing apparatus of (3), wherein the data processing unit transmits the content usage permission information to the content correspondence information providing server in a process to make an acquisition request for the encryption key.

(5) The information processing apparatus of any one of (1) through (4), wherein the data processing unit acquires the encrypted content to be stored into the data storage unit, from a content server or a medium attached to the information processing apparatus.

(6) The information processing apparatus of any one of (1) through (5), wherein the in-storage data processing unit performs an authentication process on the content correspondence information providing server, and, on condition of successful authentication, allows the content correspondence information providing server to write the encryption key into the block in the protected area.

(7) The information processing apparatus of any one of (1) through (6), wherein the in-storage data processing unit receives the server certificate from the content correspondence information providing server, and makes the access right check based on the received server certificate.

(8) A content usage managing server that performs a usage management process on content to be recorded into an information storage device attached to an information processing apparatus, wherein the information storage device has a protected area including blocks that allow access thereto based on an access right check made on each of the blocks, and the content usage managing server determines a block for storing an encryption key to be used in decrypting encrypted content recorded in the information storage device, and notifies a content correspondence information providing server of a block identifier, the content correspondence information providing server performing a process to record the encryption key, the block identifier being the identifier of the determined block.

(9) The content usage managing server of (8), which transmits the block identifier to the information processing apparatus. (10) The content usage managing server of (9), which transmits the block identifier in conjunction with content information or content usage permission information to be provided to the information processing apparatus.

(11) A content correspondence information providing server that transmits an encryption key to an information storage device attached to an information processing apparatus, the encryption key being to be used in decrypting encrypted content recorded in the information storage device, wherein the information storage device has a protected area including blocks that allow access thereto based on an access right check made on each of the blocks, and the content correspondence information providing server performs a process to write the encryption key into the block corresponding to a block identifier transmitted from a content usage managing server.

(12) The content correspondence information providing server of (11), which transmits a server certificate storing access right information about the respective blocks of the information storage device to the information storage device, and performs a process to write the encryption key when the content correspondence information providing server is confirmed to be a server allowed to write data into the block corresponding to the block identifier through a check process performed on the server certificate in the information storage device.

(13) An information processing system including:

an information processing apparatus that uses content stored in an information storage device;

a content usage managing server that provides content usage permission information to the information processing apparatus; and a content correspondence information providing server that provides an encryption key to be used in decrypting encrypted content stored in the information storage device, wherein the information storage device has a protected area including blocks that allow access thereto based on an access right check made on each of the blocks, the content usage managing server determines a block for storing the encryption key to be used in decrypting the encrypted content recorded in the information storage device, and notifies the content correspondence information providing server of a block identifier that is the identifier of the determined block, and the content correspondence information providing server performs a process to write the encryption key into the block corresponding to the block identifier transmitted from the content usage managing server.

(14) The information processing system of (13), wherein the content correspondence information providing server transmits a server certificate storing access right information about the respective blocks of the information storage device to the information storage device, and performs the process to write the encryption key when the content correspondence information providing server is confirmed to be a server allowed to write data into the block corresponding to the block identifier through a check process performed on the server certificate in the information storage device.

Further, methods of performing processes and programs for processes to be performed in the above described apparatuses and systems are also included in the present disclosure.

The series of processes described in this specification can be performed by hardware, software, or a combination of hardware and software. In a case where processes are performed by software, a program in which the process sequences are recorded may be installed into a memory incorporated into special-purpose hardware in a computer, or may be installed into a general-purpose computer that can perform various kinds of processes. For example, the program can be recorded beforehand into a recording medium. The program can be installed from the recording medium into a computer, or can be received via a network such as a LAN (Local Area Network) or the Internet and be installed into a recording medium such as an internal hard disk.

The respective processes described in this specification may not be performed in chronological order according to the description, but may be performed in parallel or independently of one another depending on the configuration/capability of the apparatus performing the processes or as necessary. In this specification, a system is a logical assembly of devices, and does not necessarily mean devices with different structures incorporated into one housing.

INDUSTRIAL APPLICABILITY

As described above, an embodiment of the present disclosure realizes a structure that can unify the management of the storage block for the encryption key to be used in decrypting encrypted content stored in a memory card.

Specifically, this structure includes: an information processing apparatus that stores content into an information storage device such as a memory card including an access allowed block based on an access right check made on each block, and uses the content; a content usage managing server that provides content usage permission information to the information processing apparatus; and a content correspondence information providing server that provides the encryption key to be used in decrypting the encrypted content stored in the information storage device. The content usage managing server determines the block for storing the encryption key and notifies the content correspondence information providing server of a block identifier that is the identifier of the determined block, and the content correspondence information providing server performs a process to write the encryption key into the block corresponding to the received block identifier.

With these apparatuses, a structure that can unify the management of the storage block for the encryption key to be used in decrypting encrypted content stored in a memory card can be realized.

REFERENCE SIGNS LIST

10 Information processing apparatus
11 Recording/reproducing apparatus
12 PC
13 Portable terminal
15 Client (host device)
20 Memory card
21 Protected area
22 General purpose area
31 Content usage managing apparatus
32 Content providing apparatus
33 Content correspondence information providing apparatus
35 Server
100 Information processing apparatus (client)
110 Disk
120 Memory card (information storage device)
130 Content usage managing server
140 Content server
150 Content correspondence information providing server
701 CPU
702 ROM
703 RAM
704 Bus
705 Input/output interface
706 Input unit
707 Output unit
708 Storage unit
709 Communication unit
710 Drive
711 Removable medium
801 CPU
802 ROM
803 RAM
804 Bus
805 Input/output interface
806 Communication unit
807 Storage unit
811 Protected area
812 General purpose area

The invention claimed is:

1. An information processing apparatus, comprising:
one or more first processors configured to:
access a data storage unit attached to the information processing apparatus,
wherein the data storage unit is configured to store encrypted content and data containing an encryption key to be used in decrypting the encrypted content, and has a protected area including a block allowing access thereto based on an access right check made on each block,
transmit an input block identifier to a content correspondence information providing server that writes the encryption key, wherein the block identifier corresponds to an identifier of a block, that is within the protected area in the data storage unit, to write the encryption key, and
write the encrypted content into the data storage unit, the data storage unit includes
one or more second processors configured to:
make the access right check to determine whether the content correspondence information providing server is a server allowed to write data into the block corresponding to the block identifier based on a server certificate set for the content correspondence information providing server, and
allow the content correspondence information providing server to write the encryption key into the block that is within the protected area based on confirmation of an access right.

2. The information processing apparatus according to claim 1, wherein the one or more first processors are further configured to input content information about the encrypted content received from a content usage managing server, and input the block identifier received from the content usage managing server, in conjunction with the content information.

3. The information processing apparatus according to claim 1, wherein the one or more first processors are further configured to input content usage permission information about the encrypted content from a content usage managing server, and input the block identifier received from the content usage managing server, in conjunction with the content usage permission information.

4. The information processing apparatus according to claim 3, wherein the one or more first processors are further configured to transmit the content usage permission information to the content correspondence information providing server to make an acquisition request for the encryption key.

5. The information processing apparatus according to claim 1, wherein the one or more first processors are further configured to acquire the encrypted content to be stored into the data storage unit, from one of a content server or a medium attached to the information processing apparatus.

6. The information processing apparatus according to claim 1, wherein the one or more second processors are further configured to perform an authentication process on the content correspondence information providing server, and, on condition of successful authentication, allow the content correspondence information providing server to write the encryption key into the block in the protected area.

7. The information processing apparatus according to claim 1, wherein the one or more second processors are further configured to receive the server certificate from the content correspondence information providing server, and make the access right check based on the received server certificate.

8. The information processing apparatus according to claim 1, wherein the content correspondence information providing server is configured to write the encryption key, in the designated block of the data storage unit, based on the block identifier.

9. A content usage managing server, comprising:
one or more processors configured to:
execute a usage management process on content to be recorded into an information storage device attached to an information processing apparatus, wherein the information storage device includes a protected area including a block that allows access based on an access right check made on each block;

determine a block to store an encryption key to be used to decrypt encrypted content recorded in the information storage device; and notify a content correspondence information providing server of a block identifier, wherein the content correspondence information providing server records the encryption key, the block identifier corresponding to an identifier of the determined block, that is within the protected area in the information storage device, to write the encryption key.

10. The content usage managing server according to claim 9, wherein the content usage managing server is further configured to transmit the block identifier to the information processing apparatus.

11. The content usage managing server according to claim 10, wherein the content usage managing server is further configured to transmit the block identifier in conjunction with one of content information or content usage permission information to be provided to the information processing apparatus.

12. A content correspondence information providing server, comprising:
one or more processors configured to:
transmit an encryption key to an information storage device attached to an information processing apparatus, the encryption key being to be used in decrypting encrypted content recorded in the information storage device,
wherein the information storage device includes a protected area including a block allowing access thereto based on an access right check made on each block;
wherein the content correspondence information providing server is further configured to write the encryption key into a block corresponding to a block identifier transmitted from a content usage managing server, and
wherein the block identifier corresponds to an identifier of a block, that is within a protected area in the information storage device, to write the encryption key.

13. The content correspondence information providing server according to claim 12, wherein the content correspondence information providing server is further configured to:
transmit a server certificate storing access right information about each block of the information storage device to the information storage device; and
write the encryption key based on confirmation that the content correspondence information providing server is allowed to write data into the block corresponding to the block identifier through a check process performed on the server certificate in the information storage device.

14. An information processing system, comprising:
an information processing apparatus configured to use content stored in an information storage device;
a content usage managing server configured to provide content usage permission information to the information processing apparatus; and
a content correspondence information providing server configured to provide an encryption key to be used in decrypting encrypted content stored in the information storage device,
wherein the information storage device has a protected area including a block allowing access thereto based on an access right check made on each block, the content usage managing server is configured to:
determine a block to store the encryption key to be used to decrypt the encrypted content recorded in the information storage device; and
notify the content correspondence information providing server of a block identifier, wherein the block identifier corresponds to an identifier of the determined block, that is within the protected area in the information storage device, to write the encryption key, and
the content correspondence information providing server is configured to write the encryption key into the block corresponding to the block identifier transmitted from the content usage managing server.

15. The information processing system according to claim 14, wherein the content correspondence information providing server is further configured to:
transmit a server certificate storing access right information about each block of the information storage device to the information storage device, and
write the encryption key based on confirmation that the content correspondence information providing server is allowed to write data into the block corresponding to the block identifier through a check process performed on the server certificate in the information storage device.

16. An information processing method, the method comprising:
in an information processing apparatus comprising one or more first processors,
accessing a data storage unit attached to the information processing apparatus,
wherein the data storage unit is configured to store encrypted content and data containing an encryption key to be used in decrypting the encrypted content, and has a protected area including a block allowing access thereto based on an access right check made on each block,
transmitting a block identifier to a content correspondence information providing server configured to write the encryption key, wherein the block identifier corresponds to an identifier of a block that is within the protected area in the data storage unit, to write the encryption key, and
writing the encrypted content into the data storage unit, and
in the data storage unit comprising one or more second processors:
performing the access right check to determine whether the content correspondence information providing server is a server allowed to write data into the block corresponding to the block identifier based on a server certificate set for the content correspondence information providing server, and
allowing the content correspondence information providing server to write the encryption key into the block in the protected area based on confirmation of an access right.

17. A non-transitory computer-readable medium storing computer-readable instructions which when executed by a computer cause the computer to perform the operations, the operations comprising:
in the information processing apparatus comprising one or more first processors:
accessing a data storage unit attached to the information processing apparatus,
wherein the data storage unit is configured to store encrypted content and data containing an encryption key to be used in decrypting the encrypted content, and has a protected area including a block allowing access thereto based on an access right check made on each block, transmitting a block identifier to a content correspondence information providing server configured to write the encryption key, wherein the block identifier corresponds to an identifier of a block, that is within the protected area in the data storage unit, to write the encryption key, and writing the encrypted content into the data storage unit, and causing one or more second processors of the data storage unit to perform:
  an access right check process to determine whether the content correspondence information providing server is a server allowed to write data into the block corresponding to the block identifier based on a server certificate set for the content correspondence information providing server, and
  a process to allow the content correspondence information providing server to write the encryption key into the block in the protected area based on confirmation of an access right.

\* \* \* \* \*